US010613515B2

(12) United States Patent
Cramer et al.

(10) Patent No.: US 10,613,515 B2
(45) Date of Patent: Apr. 7, 2020

(54) ORTHODONTIC APPLIANCES INCLUDING AT LEAST PARTIALLY UN-ERUPTED TEETH AND METHOD OF FORMING THEM

(71) Applicant: Align Technology, Inc., San Jose, CA (US)

(72) Inventors: Christopher Eric Cramer, Durham, NC (US); Jeeyoung Choi, Sunnyvale, CA (US)

(73) Assignee: Align Technology, Inc., San Jose, CA (US)

( * ) Notice: Subject to any disclaimer, the term of this patent is extended or adjusted under 35 U.S.C. 154(b) by 47 days.

(21) Appl. No.: 15/942,341

(22) Filed: Mar. 30, 2018

(65) Prior Publication Data

US 2018/0284727 A1 Oct. 4, 2018

Related U.S. Application Data

(60) Provisional application No. 62/480,243, filed on Mar. 31, 2017.

(51) Int. Cl.
*G06F 19/00* (2018.01)
*G05B 19/4099* (2006.01)
(Continued)

(52) U.S. Cl.
CPC ........ *G05B 19/4099* (2013.01); *B29C 64/393* (2017.08); *B33Y 50/00* (2014.12);
(Continued)

(58) Field of Classification Search
CPC .......... B29C 64/393; B29L 2031/7536; B33Y 50/00; B33Y 50/02; G05B 19/4099;
(Continued)

(56) References Cited

U.S. PATENT DOCUMENTS 2,171,695 A 9/1939 Harper
2,194,790 A 3/1940 Gluck
(Continued)

FOREIGN PATENT DOCUMENTS

AU 517102 B 11/1977
AU 3031677 A 11/1977
(Continued)

OTHER PUBLICATIONS

US 8,553,966 B1, 10/2013, Alpern et al. (withdrawn)
(Continued)

*Primary Examiner* — Kidest Bahta
(74) *Attorney, Agent, or Firm* — Shay Glenn LLP

(57) ABSTRACT

The example systems, methods, and/or computer-readable media described herein help with design of highly accurate models of un-erupted or partially erupted teeth and help fabricate of aligners for un-erupted or partially erupted teeth. Automated agents that use machine learning models to parametrically represent three-dimensional (3d) virtual representations of teeth as 3D descriptors in a 3D descriptor space are provided herein. In some implementations, the automated agents described herein provide instructions to fabricate aligners for at least partially un-erupted teeth using representative 3D descriptor(s) of a tooth type.

21 Claims, 18 Drawing Sheets

(51) Int. Cl.
  *B33Y 50/02* (2015.01)
  *B29C 64/393* (2017.01)
  *B33Y 50/00* (2015.01)
  *G06T 17/00* (2006.01)
  *B29L 31/00* (2006.01)

(52) U.S. Cl.
  CPC ....... *B33Y 50/02* (2014.12); *B29L 2031/7536* (2013.01); *G05B 2219/33034* (2013.01); *G05B 2219/35134* (2013.01); *G05B 2219/45167* (2013.01); *G05B 2219/49007* (2013.01); *G06T 17/00* (2013.01)

(58) Field of Classification Search
  CPC .......... G05B 2219/33034; G05B 2219/35134; G05B 2219/45167; G05B 2219/49007; G06T 17/00
  See application file for complete search history.

(56) References Cited

U.S. PATENT DOCUMENTS

| | | |
|---|---|---|
| 2,467,432 A | 4/1949 | Kesling |
| 2,531,222 A | 11/1950 | Kesling |
| 3,089,487 A | 5/1963 | Enicks et al. |
| 3,092,907 A | 6/1963 | Traiger |
| 3,178,820 A | 4/1965 | Kesling |
| 3,211,143 A | 10/1965 | Grossberg |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |
| 3,797,115 A | 3/1974 | Silverman et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,932,866 A | 6/1990 | Guis |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A | 10/1991 | Abbatte et al. |
| 5,061,839 A | 10/1991 | Matsuno et al. |
| 5,083,919 A | 1/1992 | Quachi |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |

(56) References Cited

U.S. PATENT DOCUMENTS

| | | |
|---|---|---|
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |

(56) References Cited

U.S. PATENT DOCUMENTS

| | | |
|---|---|---|
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Cohen Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman-Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |

(56) References Cited

U.S. PATENT DOCUMENTS

| | | |
|---|---|---|
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Kö rner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,160,334 B2 | 4/2012 | Thiel et al. |
| 8,172,569 B2 | 5/2012 | Matty et al. |
| 8,197,252 B1 | 6/2012 | Harrison |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,899,976 B2 | 12/2014 | Chen et al. |
| 8,936,463 B2 | 1/2015 | Mason et al. |
| 8,944,812 B2 | 2/2015 | Kou |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |

(56) References Cited

U.S. PATENT DOCUMENTS

| | | |
|---|---|---|
| 9,241,774 B2 | 1/2016 | Li et al. |
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |
| 9,675,430 B2 | 6/2017 | Verker et al. |
| 9,693,839 B2 | 7/2017 | Atiya et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,853 B2 | 11/2018 | Moss et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,258,432 B2 | 4/2019 | Webber |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |

(56) References Cited

U.S. PATENT DOCUMENTS

| | | |
|---|---|---|
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0258957 A1* | 11/2007 | Bowermaster ......... C12N 5/0607 424/93.7 |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Beiski et al. |
| 2009/0218514 A1 | 9/2009 | Klunder et al. |
| 2009/0246726 A1 | 10/2009 | Chelnokov et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0062394 A1 | 3/2010 | Jones et al. |
| 2010/0068676 A1 | 3/2010 | Mason et al. |
| 2010/0086890 A1 | 4/2010 | Kuo |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0045428 A1 | 2/2011 | Boltunov et al. |
| 2011/0056350 A1 | 3/2011 | Gale et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |

(56) References Cited

U.S. PATENT DOCUMENTS

| | | |
|---|---|---|
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0244194 A1* | 9/2013 | Bergersen ............... A61C 7/002 433/6 |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Lowe et al. |
| 2015/0182303 A1 | 7/2015 | Abraham et al. |
| 2015/0216626 A1 | 8/2015 | Ranjbar |
| 2015/0216716 A1 | 8/2015 | Anitua Aldecoa |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1 | 12/2016 | Schulhof et al. |
| 2016/0367339 A1 | 12/2016 | Khardekar et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0049311 A1 | 2/2017 | Borovinskih et al. |
| 2017/0049326 A1 | 2/2017 | Alfano et al. |
| 2017/0056131 A1 | 3/2017 | Alauddin et al. |
| 2017/0071705 A1 | 3/2017 | Kuo |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0215739 A1 | 8/2017 | Miyasato |
| 2017/0251954 A1 | 9/2017 | Lotan et al. |
| 2017/0258555 A1 | 9/2017 | Kopelman |
| 2017/0265970 A1 | 9/2017 | Verker |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2017/0340415 A1 | 11/2017 | Choi et al. |
| 2018/0000563 A1 | 1/2018 | Shanjani et al. |
| 2018/0000565 A1 | 1/2018 | Shanjani et al. |
| 2018/0028063 A1 | 2/2018 | Elbaz et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071054 A1 | 3/2018 | Ha |
| 2018/0071055 A1 | 3/2018 | Kuo |
| 2018/0085059 A1 | 3/2018 | Lee |
| 2018/0096465 A1 | 4/2018 | Levin |
| 2018/0125610 A1 | 5/2018 | Carrier et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |
| 2018/0192877 A1 | 7/2018 | Atiya et al. |
| 2018/0228359 A1 | 8/2018 | Meyer et al. |
| 2018/0318043 A1 | 11/2018 | Li et al. |
| 2018/0368944 A1 | 12/2018 | Sato et al. |
| 2019/0026599 A1 | 1/2019 | Salah et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |

(56) References Cited

U.S. PATENT DOCUMENTS

| | | | |
|---|---|---|---|
| 2019/0076216 A1 | 3/2019 | Moss et al. | |
| 2019/0090983 A1 | 3/2019 | Webber et al. | |

FOREIGN PATENT DOCUMENTS

| | | | |
|---|---|---|---|
| AU | 5598894 A | | 6/1994 |
| CA | 1121955 A1 | | 4/1982 |
| CN | 1655732 A | | 8/2005 |
| CN | 1655733 A | | 8/2005 |
| CN | 102017658 A | | 4/2011 |
| CN | 103889364 A | | 6/2014 |
| CN | 204092220 U | | 1/2015 |
| CN | 105496575 A | | 4/2016 |
| CN | 105997274 A | | 10/2016 |
| DE | 2749802 A1 | | 5/1978 |
| DE | 3526198 A1 | | 2/1986 |
| DE | 4207169 A1 | | 9/1993 |
| DE | 69327661 T2 | | 7/2000 |
| DE | 102005043627 A1 | | 3/2007 |
| DE | 202010017014 U1 | | 3/2011 |
| DE | 102011051443 A1 | | 1/2013 |
| DE | 202012011899 U1 | | 1/2013 |
| DE | 102014225457 A1 | | 6/2016 |
| EP | 0428152 A1 | | 5/1991 |
| EP | 490848 A2 | | 6/1992 |
| EP | 541500 A1 | | 5/1993 |
| EP | 714632 B1 | | 5/1997 |
| EP | 774933 B1 | | 12/2000 |
| EP | 731673 B1 | | 5/2001 |
| EP | 1941843 A2 | | 7/2008 |
| EP | 2437027 A2 | | 4/2012 |
| EP | 2447754 A1 | | 5/2012 |
| EP | 1989764 B1 | | 7/2012 |
| EP | 2332221 B1 | | 11/2012 |
| EP | 2596553 B1 | | 12/2013 |
| EP | 2612300 B1 | | 2/2015 |
| EP | 2848229 A1 | | 3/2015 |
| ES | 463897 A1 | | 1/1980 |
| ES | 2455066 A1 | | 4/2014 |
| FR | 2369828 A1 | | 6/1978 |
| FR | 2867377 A1 | | 9/2005 |
| FR | 2930334 A1 | | 10/2009 |
| GB | 1550777 A | | 8/1979 |
| JP | 53-058191 A | | 5/1978 |
| JP | 4028359 A | | 1/1992 |
| JP | 08-508174 A | | 9/1996 |
| JP | 09-19443 A | | 1/1997 |
| JP | 2003245289 A | | 9/2003 |
| JP | 2000339468 A | | 9/2004 |
| JP | 2005527320 A | | 9/2005 |
| JP | 2005527321 A | | 9/2005 |
| JP | 2006043121 A | | 2/2006 |
| JP | 2007151614 A | | 6/2007 |
| JP | 2007260158 A | | 10/2007 |
| JP | 2007537824 A | | 12/2007 |
| JP | 2008067732 A | | 3/2008 |
| JP | 2008523370 A | | 7/2008 |
| JP | 04184427 B1 | | 11/2008 |
| JP | 2009000412 A | | 1/2009 |
| JP | 2009018173 A | | 1/2009 |
| JP | 2009078133 A | | 4/2009 |
| JP | 2009101386 A | | 5/2009 |
| JP | 2009205330 A | | 9/2009 |
| JP | 2010017726 A | | 1/2010 |
| JP | 2011087733 A | | 5/2011 |
| JP | 2012045143 A | | 3/2012 |
| JP | 2013007645 A | | 1/2013 |
| JP | 2013192865 A | | 9/2013 |
| JP | 201734173 A | | 2/2017 |
| KR | 10-20020062793 A | | 7/2002 |
| KR | 10-20070108019 A | | 11/2007 |
| KR | 10-20090065778 A | | 6/2009 |
| KR | 10-1266966 B1 | | 5/2013 |
| KR | 10-2016-041632 A | | 4/2016 |
| KR | 10-2016-0071127 A | | 6/2016 |
| KR | 10-1675089 B1 | | 11/2016 |
| TW | 480166 B | | 3/2002 |
| WO | WO91/004713 A1 | | 4/1991 |
| WO | WO92/03102 A1 | | 3/1992 |
| WO | WO94/010935 A1 | | 5/1994 |
| WO | WO96/23452 A1 | | 8/1996 |
| WO | WO98/032394 A1 | | 7/1998 |
| WO | WO98/044865 A1 | | 10/1998 |
| WO | WO01/08592 A1 | | 2/2001 |
| WO | WO01/85047 A2 | | 11/2001 |
| WO | WO2002/017776 A2 | | 3/2002 |
| WO | WO2002/062252 A1 | | 8/2002 |
| WO | WO02/095475 A1 | | 11/2002 |
| WO | WO03/003932 A2 | | 1/2003 |
| WO | WO2006/096558 A2 | | 9/2006 |
| WO | WO2006/100700 A1 | | 9/2006 |
| WO | WO2006/133548 A1 | | 12/2006 |
| WO | WO2007/019709 A2 | | 2/2007 |
| WO | WO2007/071341 A1 | | 6/2007 |
| WO | WO2007/103377 A2 | | 9/2007 |
| WO | WO2008/115654 A1 | | 9/2008 |
| WO | WO2009/016645 A2 | | 2/2009 |
| WO | WO2009/085752 A2 | | 7/2009 |
| WO | WO2009/089129 A1 | | 7/2009 |
| WO | WO2009/146788 A1 | | 12/2009 |
| WO | WO2009/146789 A1 | | 12/2009 |
| WO | WO2010/059988 A1 | | 5/2010 |
| WO | WO2010/123892 A2 | | 10/2010 |
| WO | WO2012/007003 A1 | | 1/2012 |
| WO | WO2012/064684 A2 | | 5/2012 |
| WO | WO2012/074304 A2 | | 6/2012 |
| WO | WO2012/078980 A2 | | 6/2012 |
| WO | WO2012/083968 A1 | | 6/2012 |
| WO | WO2012/140021 A2 | | 10/2012 |
| WO | WO2013/058879 A2 | | 4/2013 |
| WO | WO2014/068107 A1 | | 5/2014 |
| WO | WO2014/091865 A1 | | 6/2014 |
| WO | WO2014/143911 A1 | | 9/2014 |
| WO | WO2015/015289 A2 | | 2/2015 |
| WO | WO2015/063032 A1 | | 5/2015 |
| WO | WO2015/112638 A1 | | 7/2015 |
| WO | WO2015/176004 A1 | | 11/2015 |
| WO | WO2016/004415 A1 | | 1/2016 |
| WO | WO2016/042393 A1 | | 3/2016 |
| WO | WO2016/061279 A1 | | 4/2016 |
| WO | WO2016/084066 A1 | | 6/2016 |
| WO | WO2016/099471 A1 | | 6/2016 |
| WO | WO2016/113745 A1 | | 7/2016 |
| WO | WO2016/116874 A1 | | 7/2016 |
| WO | WO2016/200177 A1 | | 12/2016 |
| WO | WO2017/006176 A1 | | 1/2017 |
| WO | WO2017/182654 A1 | | 10/2017 |
| WO | WO2018/057547 A1 | | 3/2018 |
| WO | WO2018/085718 A2 | | 5/2018 |
| WO | WO2018/232113 A1 | | 12/2018 |
| WO | WO2019/018784 A1 | | 1/2019 |

OTHER PUBLICATIONS

Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.

Alves et al.; New trends in food allergens detection: toward biosensing strategies; Critical Reviews in Food Science and Nutrition; 56(14); pp. 2304-2319; doi: 10.1080/10408398.2013.831026; Oct. 2016.

CSI Computerized Scanning and Imaging Facility; What is a maximum/minimum intensity projection (MIP/MinIP); 1 page; retrieved from the Internet (http://csi.whoi.edu/content/what-maximumminimum-intensity-projection-mipminip); Jan. 4, 2010.

Di Muzio et al.; Minimum intensity projection (MinIP); 6 pages; retrieved from the internet (https://radiopaedia.org/articles/minimum-intensity-projection-minip) on Sep. 6, 2018.

Ellias et al.; Proteomic analysis of saliva identifies potential biomarkers for orthodontic tooth movement; The Scientific World Journal; vol. 2012; Article ID 647240; dio:10.1100/2012/647240; 7 pages;

(56) References Cited

OTHER PUBLICATIONS (year of pub. sufficiently earlier than effective US filing date and any foreign priority date) 2012.

Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.

Sirona Dental Systems GmbH, CEREC 3D, Manuel utiiisateur, Version 2.0X (in French); 114 pages; (English translation of table of contents included); (year of pub. sufficiently earlier than effective US filing date and any foreign priority date); 2003.

Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.

Watson et al.; Pressures recorded at te denture base-mucosal surface interface in complete denture wearers; Journal of Oral Rehabilitation 14(6); pp. 575-589; Nov. 1987.

Wolf; Three-dimensional structure determination of semi-transparent objects from holographic data; Optics Communications; 1(4); pp. 153-156; Sep. 1969.

Riley et al.; U.S. Appl. No. 16/003,841 entitled Palatal expander with skeletal anchorage devices, filed Jun. 8, 2018.

Shanjani et al.; U.S. Appl. No. 16/019,037 entitled "Biosensor performance indicator for intraoral appliances," filed Jun. 26, 2018.

Sato et al.; U.S. Appl. No. 16/041,606 entitled "Palatal contour anchorage," filed Jul. 20, 2018.

Xue et al.; U.S. Appl. No. 16/010,087 entitled "Automatic detection of tooth type and eruption status," filed Jun. 15, 2018.

Sato et al.; U.S. Appl. No. 16/048,054 entitled "Optical coherence tomography for orthodontic aligners," filed Jul. 27, 2018.

Miller et al.; U.S. Appl. No. 16/038,088 entitled "Method and apparatuses for interactive ordering of dental aligners," filed Jul. 17, 2018.

Moalem et al.; U.S. Appl. No. 16/046,897 entitled Tooth shading, transparency and glazing, filed Jul. 26, 2018.

Nyukhtikov et al.; U.S. Appl. No. 15/998,883 entitled "Buccal corridor assessment and computation," filed Aug. 15, 2018.

Farooq et al.; Relationship between tooth dimensions and malocclusion; JPMA: The Journal of the Pakistan Medical Association; 64(6); pp. 670-674; Jun. 2014.

Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.

ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.

Video of DICOM to Surgical Guides; [Copy Not Enclosed], Can be viewed at <URL:https://youtu.be/47KtOmCEFQk; Published Apr. 4, 2016.

Sabina et al., U.S. Appl. No. 16/258,516 entitled "Diagnostic intraoral scanning" filed Jan. 25, 2019.

Sabina et al., U.S. Appl. No. 16/258,523 entitled "Diagnostic intraoral tracking" filed Jan. 25, 2019.

Sabina et al., U.S. Appl. No. 16/258,527 entitled "Diagnostic intraoral methods and apparatuses" filed Jan. 25, 2019.

Li et al.; U.S. Appl. No. 16/171,159 entitled "Alternative bite adjustment structures," filed Oct. 25, 2018.

Culp; U.S. Appl. No. 16/236,220 entitled "Laser cutting," filed Dec. 28, 2018.

Culp; U.S. Appl. No. 16/265,287 entitled "Laser cutting," filed Feb. 1, 2019.

Doruk et al.; The role of the headgear timer in extraoral cooperation; European Journal of Orthodontics; 26; pp. 289-291; Jun. 1, 2004.

Friedrich et al; Measuring system for in vivo recording of force systems in orthodontic treatment-concept and analysis of accuracy; J. Biomech.; 32(1); pp. 81-85; (Abstract Only) Jan. 1999.

Grest, Daniel; Marker-Free Human Motion Capture in Dynamic Cluttered Environments from a Single View-Point, PhD Thesis; 171 pages; Dec. 2007.

INVISALIGN; You were made to move. There's never been a better time to straighten your teeth with the most advanced clear aligner in the world; Product webpage; 2 pages; retrieved from the internet (www.invisalign.com/) on Dec. 28, 2017.

Kumar et al.; Rapid maxillary expansion: A unique treatment modality in dentistry; J. Clin. Diagn. Res.; 5(4); pp. 906-911; Aug. 2011.

Nedelcu et al.; "Scanning Accuracy and Precision in 4 Intraoral Scanners: An In Vitro Comparison Based on 3-Dimensional Analysis"; J. Prosthet. Dent.; 112(6); pp. 1461-1471; Dec. 2014.

Sahm et al.; "Micro-Electronic Monitoring of Functional Appliance Wear"; Eur J Orthod.; 12(3); pp. 297-301; Aug. 1990.

Sahm; Presentation of a wear timer for the clarification of scientific questions in orthodontic orthopedics; Fortschritte der Kieferorthopadie; 51 (4); pp. 243-247; (Translation Included) Jul. 1990.

Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.

Thera Mon; "Microsensor"; 2 pages; retrieved from the internet (www.english.thera-mon.com/the-product/transponder/index.html); on Sep. 19, 2016.

Wikipedia; Palatal expansion; 3 pages; retrieved from the internet (https://en.wikipedia.org/wiki/Palatal_expansion) on Mar. 5, 2018.

Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.

Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.

Yamada et al.; Simulation of fan-beam type optical computed-tomography imaging of strongly scattering and weakly absorbing media; Applied Optics; 32(25); pp. 4808-4814; Sep. 1, 1993.

Grove et al.; U.S. Appl. No. 15/726,243 entitled "Interproximal reduction templates," filed Oct. 5, 2017.

Cramer; U.S. Appl. No. 15/937,569 entitled "Apparatuses and methods assisting in dental therapies," filed Mar. 27, 2018.

AADR. American Association for Dental Research; Summary of Activities; Los Angeles, CA; p. 195; Mar. 20-23,(year of pub. sufficiently earlier than effective US filing dated and any foreign priority date) 1980.

Alcaniz et aL; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.

Alexander et al.; The DigiGraph Work Station Part 2 Clinical Management; J. Clin. Orthod.; pp. 402-407; (Author Manuscript); Jul. 1990.

Allesee Orthodontic Appliance: Important Tip About Wearing the Red White & Blue Active Clear Retainer System; Allesee Orthodontic Appliances—Pro Lab; 1 page; (year of pub. sufficiently earlier than effective US filing date and any foreign priority date); 1998.

Allesee Orthodontic Appliances: DuraClearTM; Porduct information; 1 page; (year of pub. sufficiently earlier than effective US filing date and any foreign priority date) 1997.

Allesee Orthodontic Appliances; The Choice is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.

Allesee Orthodontic Appliances; The Choice is Clear: Red, White & Blue . . . The Simple, Affordable, No-Braces Treatment; p(roduct information), 6 pages; (year of pub. sufficiently earlier than effective US filing date and any foreign priority date) 2003.

Allesee Orthodontic Appliances; The Choice is Clear: Red, White & Blue . . . The Simple, Affordable, No-Braces Treatment;(Patient

(56) References Cited

OTHER PUBLICATIONS

Information); retrieved from the internet (http://ormco.com/aoa/ appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
Begole et al.; A Computer System for the Analysis of Dental Casts; The Angle Orthodontist; 51(3); pp. 252-258; Jul. 1981.
Bernard et al; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253; Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(1); pp. 28-36; Jan. 1970.

Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bourke, Coordinate System Transformation; 1 page; retrived from the internet (http://astronomy.swin.edu.au/ pbourke/prolection/ coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on The Uses of the Computer in Orthodontic Practice (Part 1); Journal of Clinical Orthodontics; 13(7); pp. 442-453; (interview); Jul. 1979.
Burstone; Dr. Charles J. Burstone on the Uses of the Computer in Orthodontic Practice (Part 2); journal of Clinical Orthodontics; 13(8); pp. 539-551 (interview); Aug. 1979.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
Cottingham; Gnathologic Clear Plastic Positioner; American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret A Man With a Vision, Part 3: The Computer Gives New Vision—Literally, Part 4: Bytes 'N Bites The Computer Moves From the Front Desk to the Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
Cureton; Correcting Malaligned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
DeFranco et al.; Three-Dimensional Large Displacement Analysis of Orthodontic Appliances; Journal of Biomechanics; 9(12); pp. 793-801; Jan. 1976.

(56) References Cited

OTHER PUBLICATIONS

Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
Dent-X; Dentsim . . . Dent-x's virtual reality 3-D training simulator . . . A revolution in dental education; 6 pages; retrieved from the internet (http://www.dent-x.com/DentSim.htm); on Sep. 24, 1998.
Doyle; Digital Dentistry; Computer Graphics World; pp. 50-52 andp. 54; Oct. 2000.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Duret et al.; CAD/CAM Imaging in Dentistry; Current Opinion in Dentistry; 1(2); pp. 150-154; Apr. 1991.
Duret et al; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Felton et al.; A Computerized Analysis of the Shape and Stability of Mandibular Arch Form; American Journal of Orthodontics and Dentofacial Orthopedics; 92(6); pp. 478-483; Dec. 1987.
Friede et al.; Accuracy of Cephalometric Prediction in Orthognathic Surgery; Journal of Oral and Maxillofacial Surgery; 45(9); pp. 754-760; Sep. 1987.
Futterling et al.; Automated Finite Element Modeling of a Human Mandible with Dental Implants; JS WSCG '98—Conference Program; 8 pages; retrieved from the Internet (https://dspace5.zcu.cz/bitstream/11025/15851/1/Strasser_98.pdf) on Aug. 21, 2018.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Gim-Alldent Deutschland, "Das DUX System: Die Technik," 3 pages; (English Translation Included); (year of pub. sufficiently earlier than effective US filing date and any foreign priority date); 2002.
Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Guess et al.; Computer Treatment Estimates in Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa . . . ); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Inclused); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
JCO Interviews; Craig Andreiko , DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jones et al.; An Assessment of the Fit of a Parabolic Curve to Pre- and Post-Treatment Dental Arches; British Journal of Orthodontics; 16(2); pp. 85-93; May 1989.
Kamada et.al.; Case Reports on Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kleeman et al.; The Speed Positioner; J. Clin. Orthod.; 30(12); pp. 673-680; Dec. 1996.
Kochanek; Interpolating Splines with Local Tension, Continuity and Bias Control; Computer Graphics; 18(3); pp. 33-41; Jan. 1, 1984.
Kunii et al.; Articulation Simulation for an Intelligent Dental Care System; Displays; 15(3); pp. 181-188; Jul. 1994.
Kuroda et al.; Three-Dimensional Dental Cast Analyzing System Using Laser Scanning; American Journal of Orthodontics and Dentofacial Orthopedics; 110(4); pp. 365-369; Oct. 1996.
Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.
Leinfelder et al.; A New Method for Generating Ceramic Restorations: a CAD-CAM System; Journal of the American Dental Association; 118(6); pp. 703-707; Jun. 1989.
Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.
McCann; Inside the ADA; J. Amer. Dent. Assoc, 118:286-294; Mar. 1989.
McNamara et al.; Invisible Retainers; J. Clin Orthod.; pp. 570-578; 11 pages; (Author Manuscript); Aug. 1985.

(56) References Cited

OTHER PUBLICATIONS

McNamara et al.; Orthodontic and Orthopedic Treatment in the Mixed Dentition; Needham Press; pp. 347-353; Jan. 1993.
Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.
Moles; Correcting Mild Malalignments—As Easy as One, Two, Three; AOA/Pro Corner; 11(2); 2 pages; (year of pub. sufficiently earlier than effective US filing date and any foreign priority date) 2002.
Mormann et al.; Marginale Adaptation von adhasuven Porzellaninlays in vitro; Separatdruck aus:Schweiz. Mschr. Zahnmed.; 95; pp. 1118-1129; 8 pages; (Macine Translated English Abstract); (year of pub. sufficiently earlier than effective US filing date and any foreign priority date); 1985.
Nahoum; The Vacuum Formed Dental Contour Appliance; N. Y. State Dent. J.; 30(9); pp. 385-390; Nov. 1964.
Nash; CEREC CAD/CAM Inlays: Aesthetics and Durability in a Single Appointment; Dentistry Today; 9(8); pp. 20, 22-23 and 54; Oct. 1990.
Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages , Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.
Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of the PAR Index (Peer Assessment Rating): Reliability and Validity.; The European Journal of Orthodontics; 14(2); pp. 125-139; Apr. 1992.
Richmond et al.; The Development of a 3D Cast Analysis System; British Journal of Orthodontics; 13(1); pp. 53-54; Jan. 1986.
Richmond; Recording The Dental Cast in Three Dimensions; American Journal of Orthodontics and Dentofacial Orthopedics; 92(3); pp. 199-206; Sep. 1987.
Rudge; Dental Arch Analysis: Arch Form, A Review of the Literature; The European Journal of Orthodontics; 3(4); pp. 279-284; Jan. 1981.
Sakuda et al.; Integrated Information-Processing System in Clinical Orthodontics: An Approach with Use of a Computer Network System; American Journal of Orthodontics and Dentofacial Orthopedics; 101(3); pp. 210-220; 20 pages; (Author Manuscript) Mar. 1992.
Schellhas et al.; Three-Dimensional Computed Tomography in Maxillofacial Surgical Planning; Archives of Otolaryngology—Head and Neck Surgery; 114(4); pp. 438-442; Apr. 1988.
Schroeder et al; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens; CEREC—Computer-Reconstruction, High Tech in der Zahnmedizin; 15 pagesl; (Includes Machine Translation); (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.
The American Heritage, Stedman's Medical Dictionary; Gingiva; 3 pages; retrieved from the interent (http://reference.com/search/search?q=gingiva) on Nov. 5, 2004.
The Dental Company Sirona: Cerc omnicam and cerec bluecam brochure: The first choice in every case; 8 pages; (year of pub. sufficiently earlier than effective US filing date and any foreign priority date) 2014.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-8; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.

(56) References Cited

OTHER PUBLICATIONS

U.S. Department of Commerce, National Technical Information Service, Holodontography: An Introduction to Dental Laser Holography; School of Aerospace Medicine Brooks AFB Tex; Mar. 1973, 40 pages; Mar. 1973.

U.S. Department of Commerce, National Technical Information Service; Automated Crown Replication Using Solid Photography SM; Solid Photography Inc., Melville NY,; 20 pages; Oct. 1977.

Van Der Linden et al.; Three-Dimensional Analysis of Dental Casts by Means of the Optocom; Journal of Dental Research; 51(4); p. 1100; Jul.-Aug. 1972.

Van Der Linden; A New Method to Determine Tooth Positions and Dental Arch Dimensions; Journal of Dental Research; 51(4); p. 1104; Jul.-Aug. 1972.

Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.

Van Hilsen et al.; Comparing potential early caries assessment methods for teledentistry; BMC Oral Health; 13(16); doi: 10.1186/1472-6831-13-16; 9 pages; Mar. 2013.

Varady et al.; Reverse Engineering of Geometric Models An Introduction; Computer-Aided Design; 29(4); pp. 255-268; 20 pages; (Author Manuscript); Apr. 1997.

Verstreken et al.; An Image-Guided Planning System for Endosseous Oral Implants; IEEE Transactions on Medical Imaging; 17(5); pp. 842-852; Oct. 1998.

Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.

Warunek et.al.; Clinical Use of Silicone Elastomer Applicances; JCO; 23(10); pp. 694-700; Oct. 1989.

Wells; Application of the Positioner Appliance in Orthodontic Treatment; American Journal of Orthodontics; 58(4); pp. 351-366; Oct. 1970.

Williams; Dentistry and CAD/CAM: Another French Revolution; J. Dent. Practice Admin.; 4(1); pp. 2-5 Jan./Mar. 1987.

Williams; The Switzerland and Minnesota Developments in CAD/CAM; Journal of Dental Practice Administration; 4(2); pp. 50-55; Apr./Jun. 1987.

Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.

WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.

Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.

Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.

Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.

Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.

Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.

Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.

Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.

Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.

Arakawa et al; Mouthguard biosensor with telemetry system for monitoring of saliva glucose: A novel cavitas sensor; Biosensors and Bioelectronics; 84; pp. 106-111; Oct. 2016.

O'Leary et al.; U.S. Appl. No. 16/195,701 entitled "Orthodontic retainers," filed Nov. 19, 2018.

Shanjani et al., U.S. Appl. No. 16/206,894 entitled "Sensors for monitoring oral appliances," filed Nov. 28, 2019.

Shanjani et al., U.S. Appl. No. 16/231,906 entitled "Augmented reality enhancements for dental practitioners." Dec. 24, 2018.

Kopleman et al., U.S. Appl. No. 16/220,381 entitled "Closed loop adaptive orthodontic treatment methods and apparatuses," Dec. 14, 2018.

Bernabe et al.; Are the lower incisors the best predictors for the unerupted canine and premolars sums? An analysis of peruvian sample; The Angle Orthodontist; 75(2); pp. 202-207; Mar. 2005.

Collins English Dictionary; Teeth (definition); 9 pages; retrieved from the internet (https:www.collinsdictionary.com/us/dictionary/english/teeth) on May 13, 2019.

Dental Monitoring; Basics: How to put the cheek retractor?; 1 page (Screenshot); retrieved from the interenet (https://www.youtube.com/watch?v=6K1HXw4Kq3c); May 27, 2016.

Dental Monitoring; Dental monitoring tutorial; 1 page (Screenshot); retrieved from the internet (https:www.youtube.com/watch?v=Dbe3udOf9_c); Mar. 18, 2015.

dictionary.com; Plural (definition); 6 pages; retrieved from the internet ( https://www.dictionary.com/browse/plural#) on May 13, 2019.

dictionary.com; Quadrant (definition); 6 pages; retrieved from the internet ( https://www.dictionary.com/browse/quadrant?s=t) on May 13, 2019.

Ecligner Selfie; Change your smile; 1 page (screenshot); retrieved from the internet (https:play.google.com/store/apps/details?id=parklict.ecligner); on Feb. 13, 2018.

Martinelli et al.; Prediction of lower permanent canine and premolars width by correlation methods; The Angle Orthodontist; 75(5); pp. 805-808; Sep. 2005.

Nourallah et al.; New regression equations for predicting the size of unerupted canines and premolars in a contemporary population; The Angle Orthodontist; 72(3); pp. 216-221; Jun. 2002.

Paredes et al.; A new, accurate and fast digital method to predict unerupted tooth size; The Angle Orthodontist; 76(1); pp. 14-19; Jan. 2006.

Levin; U.S. Appl. No. 16/282,431 entitled "Estimating a surface texture of a tooth," filed Feb. 2, 2019.

Bandodkar et al.; All-printed magnetically self-healing electrochemical devices; Science Advances; 2(11); 11 pages; e1601465; Nov. 2016.

Bandodkar et al.; Self-healing inks for autonomous repair of printable electrochemical devices; Advanced Electronic Materials; 1(12); 5 pages; 1500289; Dec. 2015.

Bandodkar et al.; Wearable biofuel cells: a review; Electroanalysis; 28 (6); pp. 1188-1200; Jun. 2016.

Bandodkar et al.; Wearable chemical sensors: present challenges and future prospects; Acs Sensors; 1(5); pp. 464-482; May 11, 2016.

Imani et al.; A wearable chemical-electrophysiological hybrid biosensing system for real-time health and fitness monitoring; Nature Communications; 7; 11650. doi 1038/ncomms11650; 7 pages; May 23, 2016.

(56) References Cited

OTHER PUBLICATIONS

Jia et al.; Epidermal biofuel cells: energy harvesting from human perspiration; Angewandle Chemie International Edition; 52(28); pp. 7233-7236; Jul. 8, 2013.
Jia et al.; Wearable textile biofuel cells for powering electronics; Journal of Materials Chemistry A; 2(43); pp. 18184-18189; Oct. 14, 2014.
Jeerapan et al.; Stretchable biofuel cells as wearable textile-based self-powered sensors; Journal of Materials Chemistry A; 4(47); pp. 18342-18353; Dec. 21, 2016.
Kim et al.; Advanced materials for printed wearable electrochemical devices: A review; Advanced Electronic Materials; 3(1); 15 pages; 1600260; Jan. 2017.
Kim et al.; Noninvasive alcohol monitoring using a wearable tatto-based iontophoretic-biosensing system; Acs Sensors; 1(8); pp. 1011-1019; Jul. 22, 2016.
Kim et al.; Non-invasive mouthguard biosensor for continuous salivary monitoring of metabolites; Analyst; 139(7); pp. 1632-1636; Apr. 7, 2014.
Kim et al.; A wearable fingernail chemical sensing platform: pH sensing at your fingertips; Talanta; 150; pp. 622-628; Apr. 2016.
Kim et al.; Wearable salivary uric acid mouthguard biosensor with integrated wireless electronics; Biosensors and Bioelectronics; 74; pp. 1061-1068; 19 pages; (Author Manuscript); Dec. 2015.
Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.
Kumar et al.; Biomarkers in orthodontic tooth movement; Journal of Pharmacy Bioallied Sciences; 7(Suppl 2); pp. S325-S330; 12 pages; (Author Manuscript); Aug. 2015.
Parrilla et al.; A textile-based stretchable multi-ion potentiometric sensor; Advanced Healthcare Materials; 5(9); pp. 996-1001; May 2016.
Windmiller et al.; Wearable electrochemical sensors and biosensors: a review; Electroanalysis; 25(1); pp. 29-46; Jan. 2013.
Zhou et al.; Bio-logic analysis of injury biomarker patterns in human serum samples; Talanta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.; U.S. Appl. No. 16/198,488 entitled "Intraoral scanner with dental diagnostics capabilities," filed Nov. 21, 2018.
Elbaz et al.; U.S. Appl. No. 16/188,262 entitled "Intraoral scanner with dental diagnostics capabilities," filed Nov. 12, 2018.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.

Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/OBB/OBBT.html); retrieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide; journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.
Vevin et al.; Pose estimation of teeth through crown-shape matching; In Medical Imaging: Image Processing of International Society of Optics and Photonics; vol. 4684; pp. 955-965; May 9, 2002.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wiedmann; According to the laws of harmony to find the right tooth shape with assistance of the computer; Digital Dental News; 2nd Vol.; pp. 0005-0008; (English Version Included); Apr. 2008.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.

(56) References Cited

OTHER PUBLICATIONS

Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.

\* cited by examiner

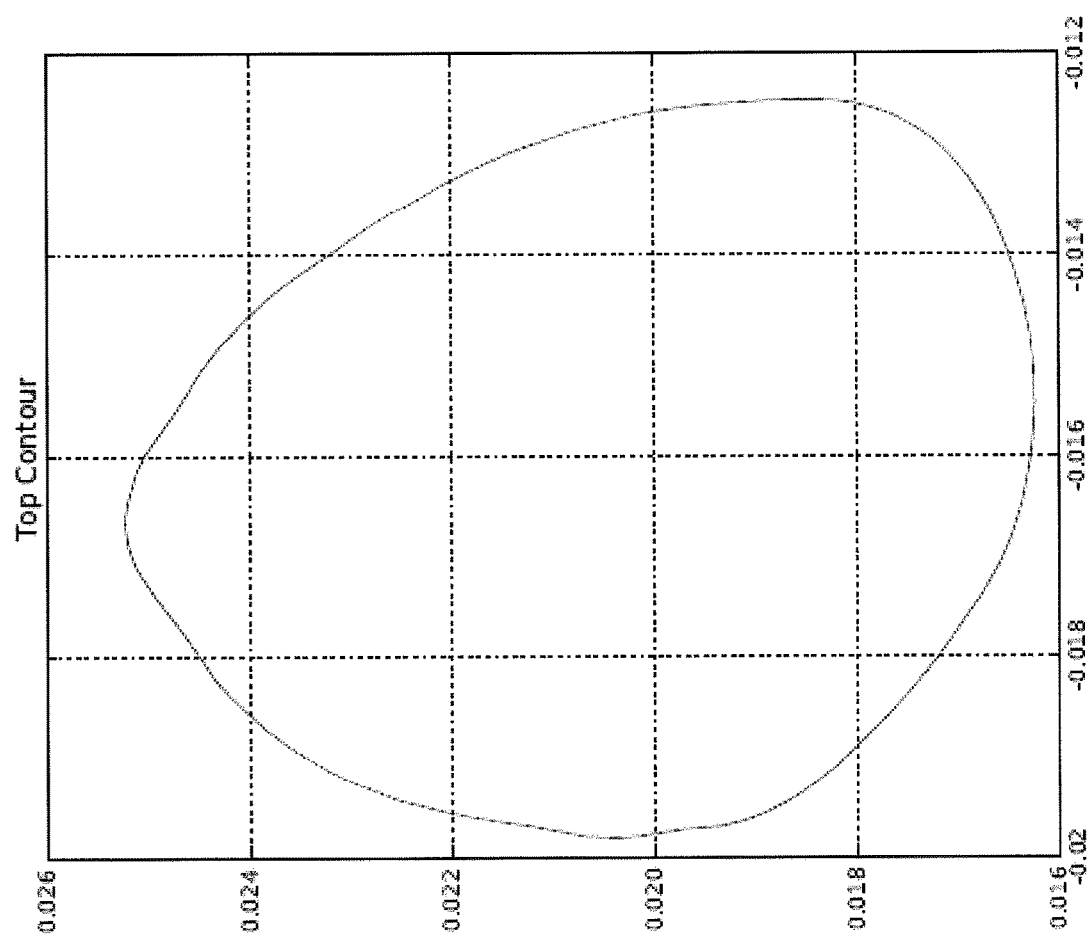

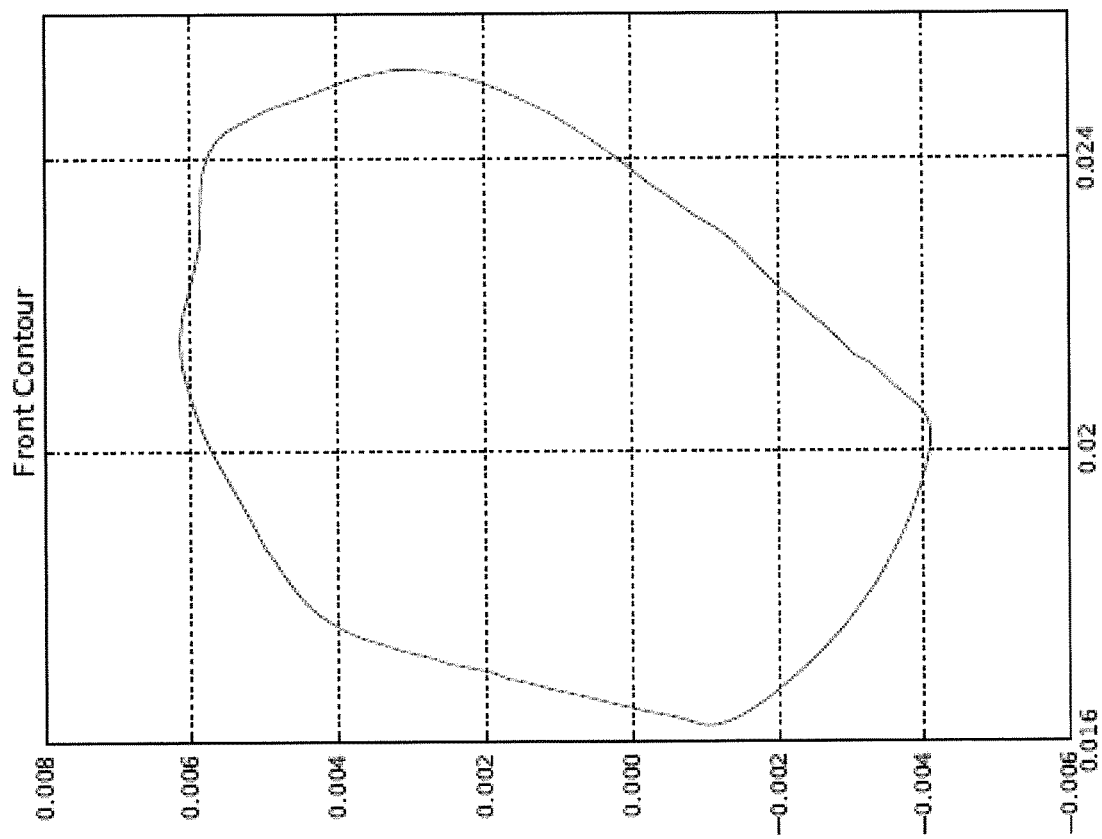

ORTHODONTIC APPLIANCES INCLUDING AT LEAST PARTIALLY UN-ERUPTED TEETH AND METHOD OF FORMING THEM

CROSS REFERENCE TO RELATED APPLICATIONS

The present application claims priority to U.S. Provisional Patent Application No. 62/480,243, entitled "VIRTUAL GEOMETRY IN DENTAL ALIGNERS BY MEANS OF CREATING MATHEMATICAL REPRESENTATIONS OF TOOTH SHAPES," filed Mar. 31, 2017, the contents of which are hereby incorporated by reference as if set forth fully herein.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

In many pediatric cases, orthodontic aligners may be used before all of the patient's permanent teeth have completely erupted. For instance, an orthodontic treatment plan may call for use of removable orthodontic aligners on a pediatric patient even though the patient has un-erupted or partially erupted teeth. In such cases, the orthodontic aligner may need to be designed to accommodate the un-erupted or partially erupted teeth. While conventional techniques make it possible to predict the size of an un-erupted or partially erupted tooth with a high degree of accuracy, conventional techniques are presently unable to predict the shape of such a tooth. In the absence of such a prediction, orthodontic aligners currently create a space buffer or cavity in the shape of a generic tooth (e.g., a tooth shape that was observed to fit over a sample size of observed teeth) that can be positioned above the point at which the permanent tooth will erupt.

While convenient in some instances, conventional techniques may present numerous challenges. For instance, a conventional space buffer or cavity having a generic tooth shape may not look "natural" in the context of an un-erupted or partially erupted tooth it is positioned over. As another example, a conventional space buffer or cavity having a generic tooth shape may come into contact with an un-erupted or partially erupted tooth, and as a result, may interrupt tooth eruption and/or cause discomfort. For these and other reasons, the systems, methods, and/or computer-readable media discussed herein are provided.

SUMMARY OF THE DISCLOSURE

The 3D descriptors may provide parametric descriptions of virtual contours of the 3D virtual representations identified thereon. As noted herein, automated agents may identify descriptor distances in the 3D descriptor space between 3D descriptors in order to identify representative 3D descriptor(s) of a tooth type.

An anatomical identifier of a tooth type of an at least partially un-erupted tooth of a patient (e.g., a pediatric patient) may be gathered. The anatomical identifier may comprise a universal tooth number, a character string associated with the tooth type, or an automated identification of the tooth type through, e.g., an image. Automated agents may identify the tooth type using the anatomical identifier. Automated agents may gather one or more representative 3D descriptors for the tooth type. The representative 3D descriptor may be selected from a plurality of 3D descriptors for the tooth type. The plurality of 3D descriptors may include the representative 3D descriptor and may parametrically represent a plurality of virtual surface contours of the tooth type according to a plurality of spatial parameters. In general, the 3D descriptors may be referred to as mathematical 3D descriptors, an may include a numeric description, a geometric description, and mathematical and/or geometric relationship description, or the like. Similarly, the 3D descriptor space may be referred to as mathematical 3D descriptor space.

In some implementations, the representative 3D descriptor has a minimum "distance" (e.g., in the 3D descriptor space) to other 3D descriptors of the plurality of 3D descriptors. Each of the plurality of 3D descriptors may be associated with one of the plurality of 3D virtual representations of a plurality of teeth gathered from a plurality of subjects. As noted herein, such 3D virtual representations may be gathered from, e.g., scans, images, models, etc. of teeth of the tooth type from subjects whose teeth have been imaged. The automated agents described herein may form a virtual 3D tooth shape for the at least partially un-erupted tooth using the representative 3D descriptor. As noted herein, instructions to form at least a portion of a removable orthodontic appliance for the at least partially un-erupted tooth using the 3D tooth shape for the at least partially un-erupted tooth may be provided.

In some implementations, the plurality of 3D virtual representations of teeth each comprise a plurality of orthoscopic views of the corresponding plurality of teeth. The plurality of 3D descriptors may comprise a convex bounding 3D shape. The plurality of 3D descriptors may be represented using an Elliptic Fourier Descriptor (EFD) of the plurality of virtual surface contours. The plurality of spatial parameters may comprise one or more locational components.

In some implementations, the plurality of 3D descriptors comprises a plurality of spheres. The plurality of spheres may comprise a plurality of voxelized spheres, a plurality of spheres that are not voxelized, or some combination thereof. In various implementations, the plurality of spatial parameters comprise a plurality of polar coordinates to virtually represent a plurality of voxelized spheres.

The removable orthodontic appliances may comprise a polymeric appliance such as a polymeric orthodontic appliance and/or a polymeric appliance designed to incrementally change tooth positions. In some implementations, providing instructions to form at least the portion of the removable orthodontic appliance comprises providing instructions to three-dimensionally print the at least the portion of the removable orthodontic appliance.

The representative 3D descriptor may comprise an average 3D descriptor of the plurality of 3D descriptors.

In some implementations, systems, methods, and/or computer-readable media may include: gathering a second anatomical tooth identifier of the tooth type, the second anatomical tooth identifier forming a basis to identify the tooth type; gathering, using the second anatomical tooth identifier, the plurality of 3D virtual representations of a plurality of teeth from a plurality of subjects, identifying the plurality of virtual surface contours for the tooth type; identifying the plurality of 3D descriptors to parametrically represent the plurality of virtual surface contours according to the plurality of spatial parameters; identifying a descriptor location in the 3D descriptor space of each of the plurality of 3D descriptors; assigning a descriptor distance to each of the plurality of 3D descriptors, the descriptor distance representing a difference between the descriptor location of the each 3D descriptor and the descriptor location of a rest of the plurality of 3D descriptors; and identifying the representative 3D descriptor for the tooth type by finding a minimum descriptor distance between two or more of the plurality of 3D descriptors.

In some implementations, assigning the descriptor distance comprises: identifying a variance between the each of the plurality of 3D descriptors and the rest of the plurality of 3D descriptors; and minimizing the variance. In various implementations, rotational orientations or sizes of the plurality of 3D descriptors are normalized before identifying the representative 3D descriptor for the tooth type. In some implementations, identifying the plurality of 3D descriptors comprises creating at least one spherical harmonic based signature based on a sum of spherical harmonics for the plurality of 3D descriptors. In various implementations, the at least one spherical harmonic based signature comprises a plurality of spherical harmonic based signatures; and finding the minimum descriptor distance comprises identifying a minimum distance between two or more of the plurality of spherical harmonic based signatures in the 3D descriptor space. Additionally, identifying the minimum distance may comprise performing a least squares analysis of a Euclidean distance between the two or more of the plurality of spherical harmonic based signatures.

Additionally, as noted herein, there may be needs to address technical problems related to providing a space buffer that looks "average" for a particular tooth type, to produce more normal and natural looking virtual geometry that is more universally accommodating to the erupting tooth despite uniqueness of each patient's dentition.

The present application relates to an orthodontic device designed to accommodate an at least partially un-erupted tooth. The device can include a cavity positioned over the erupting site before or during eruption and configured to accommodate an erupting tooth without interfering with or contacting the erupting tooth.

In another aspect, the cavity can be designed to represent or approximate a representative tooth shape, with size to be determined on a per-patient basis, for each of the teeth in the Universal Numbering System. The representative tooth shape may be intended to accommodate erupting teeth without interfering with eruption, while representing a most probable tooth shape and being more aesthetically pleasing to the patient.

In another aspect, the cavity can be designed based on evaluating data representing a plurality of teeth for each of the teeth in the Universal Numbering System. Techniques can be applied to the data to calculate the representative tooth shape for each tooth of a patient. The technique can use 2D Elliptic Fourier Descriptors (EFDs) to determine the representative tooth shape. In another embodiment, the technique can use spherical harmonics to determine the representative tooth shape.

Once the representative tooth shape has been computed, the orthodontic device can be manufactured incorporating one or more cavities into the device in the shape of the representative tooth for that specific un-erupted or erupting tooth.

In some embodiments, a method for accommodating an at least partially un-erupted during a proposed orthodontic treatment is provided, comprising identifying, via a computing device, whether a patient's arch contains an at least partially un-erupted tooth, receiving, via the computing device, data representing a plurality of teeth corresponding to an anatomical identifier (e.g., a universal tooth number) of the at least partially un-erupted tooth, evaluating the data representing the plurality of teeth with a technique to determine a representative 3D shape for the at least partially un-erupted teeth after they have fully erupted, determining a scaling factor, via the computing device, for a cavity of a dental appliance positioned to accommodate the at least partially un-erupted tooth as the tooth erupts, and creating the dental appliance configured to reposition at least one tooth of the patient, the dental appliance including the cavity having the representative 3D shape and being sized according to the scaling factor for the un-erupted or erupting tooth.

In some embodiments, the modeling technique comprises generating two-dimensional top, front, and side views from the data representing the plurality of teeth.

In another embodiment, the modeling technique further comprises generating a characteristic, convex bounding shape for each two-dimensional top, front, and side view. In some embodiments, the modeling technique further comprises representing the convex bounding shape for each two-dimensional top, front, and side view using elliptic Fourier descriptors.

In some embodiments, the modeling technique further comprises normalizing the elliptic Fourier descriptors to provide rotation and size invariance.

In one embodiment, the modeling technique further comprises computing a principal component analysis to find the optimal 3D shape for the cavity from the data representing the plurality of teeth.

In yet another embodiment, the modeling technique comprises scaling a length of the longest axis of each of the teeth from the data representing the plurality of teeth. The modeling technique can further comprise forming a voxelized sphere for each of the teeth from the data representing the plurality of teeth to an array having uniform size.

In some embodiments, the modeling technique further comprises summing spherical harmonics for each point of the voxelized sphere over a specific frequency range to compute a spherical harmonic signature for each tooth.

In other embodiments, the modeling technique further comprises computing a Euclidean distance between each tooth's spherical harmonic signature to find the optimal 3D shape for the cavity from the data representing the plurality of teeth.

A dental appliance having a cavity for accommodating an un-erupted or erupting tooth is also provided, comprising an appliance designed to implement at least a portion of a treatment plan, comprising a shell having a plurality of cavities therein designed to receive teeth of a jaw with at least one of the plurality of cavities being a cavity for accommodating an at least partially un-erupted tooth therein, wherein at least one of a size, shape, location, and orientation of at least one of the cavities for accommodating an at least partially un-erupted tooth is designed based upon a evaluation of a sample of teeth that calculates an optimal 3D shape for the at least partially un-erupted tooth.

In some embodiments, the evaluation comprises generating two-dimensional top, front, and side views from the data representing the plurality of teeth, generating a characteristic, convex bounding shape for each two-dimensional top, front, and side views, representing the convex bounding shape for each two-dimensional top, front, and side view using elliptic Fourier descriptors, normalizing the elliptic Fourier descriptors to provide rotation and size invariance, and computing a principal component analysis to find the optimal 3D shape for the cavity from the data representing the plurality of teeth.

In another embodiment, the modeling technique comprises scaling a length of the longest axis of each of the teeth from the data representing the plurality of teeth, forming a voxelized sphere for each of the teeth from the data representing the plurality of teeth to an array having uniform size, summing spherical harmonics for each point of the voxelized sphere over a specific frequency range to compute a spherical harmonic signature for each tooth, and computing a Euclidean distance between each tooth's spherical harmonic signature to find the optimal 3D shape for the cavity from the data representing the plurality of teeth.

A non-transitory computing device readable medium is provided that has instructions stored thereon that are executable by a processor to cause a computing device to receive, via a computing device, data representing a plurality of teeth, identify data indicating which of the plurality of teeth are at least partially un-erupted, determine an optimal 3D shape for each of the un-erupted or erupting teeth after they have fully erupted using a modeling technique, and generate a series of incremental tooth arrangements incorporating the optimal 3D shape into a cavity positioned over each of the un-erupted or erupting teeth to define a proposed orthodontic treatment.

In some embodiments, the modeling technique comprises generating two-dimensional top, front, and side views from the data representing the plurality of teeth.

In other embodiments, the modeling technique further comprises generating a characteristic, convex bounding shape for each two-dimensional top, front, and side view.

In another embodiment, the modeling technique further comprises representing the convex bounding shape for each two-dimensional top, front, and side view using elliptic Fourier descriptors. In some embodiments, the modeling technique further comprises normalizing the elliptic Fourier descriptors to provide rotation and size invariance. In other embodiments, the modeling technique further comprises computing a principal component analysis to find the optimal 3D shape for the cavity from the data representing the plurality of teeth.

In one embodiment, the modeling technique comprises scaling a length of the longest axis of each of the teeth from the data representing the plurality of teeth.

In another embodiment, the modeling technique further comprises forming a voxelized sphere for each of the teeth from the data representing the plurality of teeth to an array having uniform size.

In some embodiments, the modeling technique further comprises summing spherical harmonics for each point of the voxelized sphere over a specific frequency range to compute a spherical harmonic signature for each tooth.

In another embodiment, the modeling technique further comprises computing a Euclidean distance between each tooth's spherical harmonic signature to find the optimal 3D shape for the cavity from the data representing the plurality of teeth.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 2D, 2E, and 2F are diagrams showing examples of convex bounding shapes corresponding to the top, front, and side views of FIGS. 2A, 2B, and 2C.

DETAILED DESCRIPTION

The present disclosure is related to systems, methods, computing device readable media, and devices that solve technical problems related to design of highly accurate models of un-erupted or partially erupted teeth ("at least partially un-erupted teeth") and/or technical problems related to fabrication of aligners for at least partially un-erupted teeth. Automated agents that use machine learning models to parametrically represent three-dimensional (3D) virtual representations of teeth as 3D descriptors (e.g., mathematical 3D descriptors) in a 3D descriptor space (e.g., mathematical 3D descriptor space) are provided herein. The 3D descriptors may provide parametric descriptions of virtual contours of the 3D virtual representations identified thereon. In some implementations, the automated agents described herein provide instructions to fabricate aligners for at least partially un-erupted teeth using representative 3D descriptor(s) of a tooth type.

Example Structures and Systems

Figure 1A:
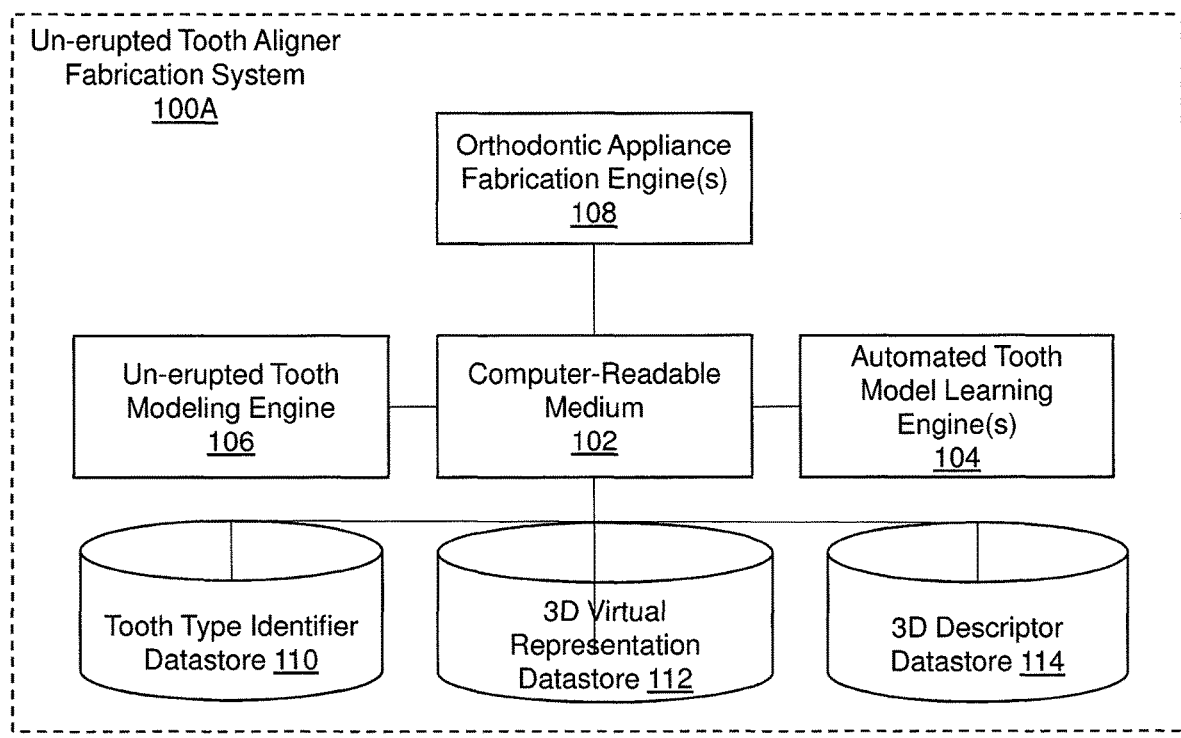
FIG. 1A is a diagram showing an example of an un-erupted tooth aligner fabrication system.

FIG. 1A is a diagram showing an example of an un-erupted tooth aligner fabrication system 100A. The parts (e.g., modules, components, circuits, etc.) of the un-erupted tooth aligner fabrication system 100A may include one or more engines and datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The un-erupted tooth aligner fabrication system 100A may include a computer-readable medium 102, 20 automated tooth model learning engine(s) 104, un-erupted tooth modeling engine(s) 106, orthodontic appliance (e.g., including, but not limited to aligners) fabrication engine(s) 108, a tooth type identifier datastore 110, a 3D virtual representation datastore 112, and a 3D descriptor datastore 114. One or more of the modules of the un-erupted tooth aligner fabrication system 100A may be coupled to one another (e.g., through the example couplings shown in FIG. 1A) or to modules not explicitly shown in FIG. 1A. The computer-readable medium 102 may include any computer-readable medium, including without limitation a bus, a wired network, a wireless network, or some combination thereof.

The automated tooth modeling learning engine(s) 104 may implement one or more automated agents configured to learn tooth models for various tooth types based on 3D virtual representations of teeth taken from subjects. A "tooth type," as used herein, may refer to a specific tooth in the mouth of a human being. A tooth type may include any specific tooth identified according to an "anatomical tooth identifier," which as used herein, may refer to any identifier used to anatomically identify the tooth type. Examples of anatomical tooth identifiers include identifiers of a universal or other tooth numbering system, character identifiers, image(s), etc. A "3D virtual representation," as used herein, may refer to a 3D rendering of a tooth. Examples of 3D virtual representations include animated 3D renderings, composite 3D renderings assembled from 2D images, etc. A 3D virtual representation may have one or more "virtual surface contours," or contours that define surfaces of the tooth in a virtual 3D space.

In various implementations, the automated tooth modeling engine(s) 104 implement one or more automated agents configured to describe 3D virtual representations of teeth with 3D descriptors that use spatial parameters. A "mathematical 3D descriptor," as used herein, may refer to a function that represents virtual surface contours and/or other portions of 3D virtual representations of teeth according to spatial parameters. Examples of 3D descriptors include Elliptical Fourier Descriptors (EFDs), spherical harmonic functions that use voxelized spheres, and spherical harmonic functions that use non-voxelized spheres. A "spatial parameter," as used herein, may refer to a parameter that relates to a spatial element. Examples of spatial parameters include locational coordinates identified along orthogonal systems, such as three translational planes, 3D polar coordinates, etc. As noted herein, 3D descriptors may "parametrically represent" a 3D virtual representation, or represent that 3D virtual representation according to one or more parameters, such as spatial parameters.

In various implementations, 3D descriptors may form a "mathematical 3D descriptor space," or a datastore of 3D descriptors with descriptor locations assigned for each 3D descriptor space. "Descriptor locations," as used herein, may refer to unique coordinates in the 3D descriptor space where each 3D descriptor reside. In various implementations, descriptor locations may be used to define "descriptor distances," or differences in distances between descriptor locations of 3D descriptors in a 3D descriptor space.

In some implementations, the automated tooth modeling engine(s) 104 identify a representative 3D descriptor for a given tooth type. A "representative 3D descriptor," as used herein, may refer to a 3D descriptor for a tooth type that is most similar to other 3D descriptors for that tooth type. In some implementations, the representative 3D descriptor may reside a minimum distance from other 3D descriptors for a tooth type. A "minimum distance," as used in this context, may refer to the minimum descriptor distance between a single 3D descriptor for a tooth type and all other 3D descriptors for that tooth type in the 3D descriptor space. The minimum distance may be determined using the techniques described herein.

In various implementations, the automated tooth modeling engine(s) 104 implement one or more automated agents configured to gather tooth type identifiers for various tooth types from the tooth type identifier datastore 110, gather 3D virtual representations of those tooth types from the 3D virtual representation datastore 112, and identify representative 3D descriptors for various tooth types. The automated agents may further be configured to store the representative 3D descriptors for various tooth types in the 3D descriptor datastore 114.

The un-erupted tooth modeling engine(s) 106 may implement one or more automated agents configured to create virtual tooth models of different tooth types. In some implementations, the un-erupted tooth modeling engine(s) 106 may be configured to gather a tooth type of an at least partially un-erupted tooth from the tooth type identifier datastore 110. The un-erupted tooth modeling engine(s) 106 may further be configured to gather a representative 3D descriptor for the tooth type (using e.g., an anatomical tooth identifier) from the 3D descriptor datastore 114. The un-erupted tooth modeling engine(s) 106 may be configured to provide instructions to the orthodontic appliance fabrication engine(s) 108 to fabricate at least a portion of an aligner for the least partially un-erupted tooth. The instructions may include a virtual 3D shape formed in accordance with the representative 3D descriptor.

The orthodontic appliance fabrication engine(s) 108 may implement one or more automated agents configured to fabricate an aligner. Examples of an aligner are described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., Santa Clara, Calif., under the tradename, Invisalign System. Throughout the description herein, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances." The orthodontic appliance fabrication engine(s) 108 may be part of 3D printing systems, thermoforming systems, or some combination thereof.

The tooth type identifier datastore 110 may be configured to store one or more tooth type identifiers of different tooth types. In some implementations, the tooth type identifiers correspond to numbers of a Universal Tooth Numbering System, character strings to identify tooth types by anatomy, images or portions thereof to identify tooth types by geometry and/or other characteristics, etc.

The 3D virtual representation datastore 112 may be configured to store 3D virtual representations of different tooth types. As will be noted herein, the 3D virtual representations may comprise 3D models of teeth, indexed by tooth type, taken from a variety of subjects. Examples of such subjects include past orthodontic patients, models, cadavers, etc.

The 3D descriptor datastore 114 may be configured to store 3D descriptors. As noted further herein, in some implementations, the 3D descriptors may be indexed by tooth type and/or by tooth type identifier. The 3D descriptors may form a 3D descriptor space having descriptor locations and/or the properties of such a space, as noted herein.

Figure 1B:
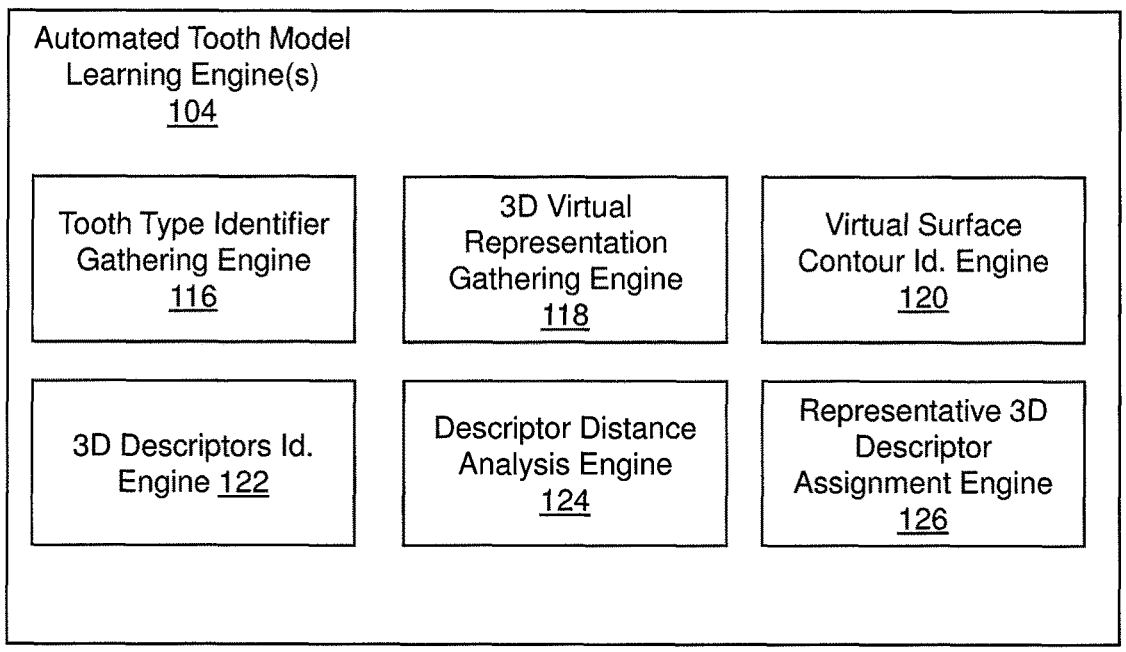
FIG. 1B is a diagram showing an example of automated tooth model learning engine(s).

FIG. 1B is a diagram showing an example of the automated tooth model learning engine(s) 104. The automated tooth model learning engine(s) 104 may include a tooth type identifier gathering engine 116, a 3D virtual representation gathering engine 118, a virtual surface contour identification engine 120, a 3D descriptor identification engine 122, a descriptor distance analysis engine 124, and a representative 3D descriptor assignment engine 126. One or more of the modules of the automated tooth model learning engine(s) 104 may be coupled to one another (e.g., through the example couplings shown in FIG. 1B) or to modules not explicitly shown in FIG. 1B.

The tooth type identifier gathering engine 116 may implement one or more automated agents configured to gather tooth type identifiers from the tooth type identifier datastore 110. In some implementations, the tooth type identifier gathering engine 116 gathers a series of tooth type identifiers corresponding to the teeth in a human being's permanent/adult dentition. The tooth type identifier gathering engine 116 may gather from the tooth type identifier datastore 110 universal or other tooth numbering system, character identifiers, image(s), etc. corresponding to a person's adult teeth. In various implementations, the tooth type identifier gathering engine 116 provides tooth types to other modules, such as the 3D virtual representation gathering engine 118.

The 3D virtual representation gathering engine 118 may implement one or more automated agents configured to gather 3D virtual representations of tooth types from the 3D virtual representation datastore 112. The 3D virtual representation gathering engine 118 may implement one or more automated database queries to the 3D virtual representation datastore 112. The database queries may request 3D virtual representations based on tooth type identifiers and may receive 3D virtual representations and/or identifiers of 3D virtual representations in response to these queries. In some implementations, the 3D virtual representation gathering engine 118 may decompose 3D virtual representations into, e.g., orthoscopic views along orthogonal directions.

The virtual surface contour identification engine 120 may implement one or more automated agents configured to identify virtual surface contours of 3D virtual representations of tooth types. The virtual surface contour identification engine 120 may use one or more optical feature recognition techniques to identify object boundaries, virtual curves, and/or other aspects of virtual surfaces. The virtual surface contour identification engine 120 may provide virtual surface contour identifiers in a relevant format, such as a set of points and/or a point cloud defining a contour, a function describing a contour, etc. The virtual surface contour identification engine 120 may provide information about virtual contours to one or more other modules of the automated tooth model learning engine(s) 104, such as the 3D descriptors identification engine 122.

The 3D descriptors identification engine 122 may implement one or more automated agents configured to identify 3D descriptors to represent virtual surface contours. In some implementations, the 3D descriptors identification engine 122 represents virtual surface contours using 3D descriptors comprising EFDs. An example of this technique will now be discussed with reference to FIGS. 2A, 2B, 2C, 3, and 4. In various implementations, the 3D descriptors identification engine 122 may be configured to evaluate two-dimensional (2D) orthoscopic views of sample teeth (e.g., those sharing a tooth type) from a plurality of subjects.

Figure 2A:
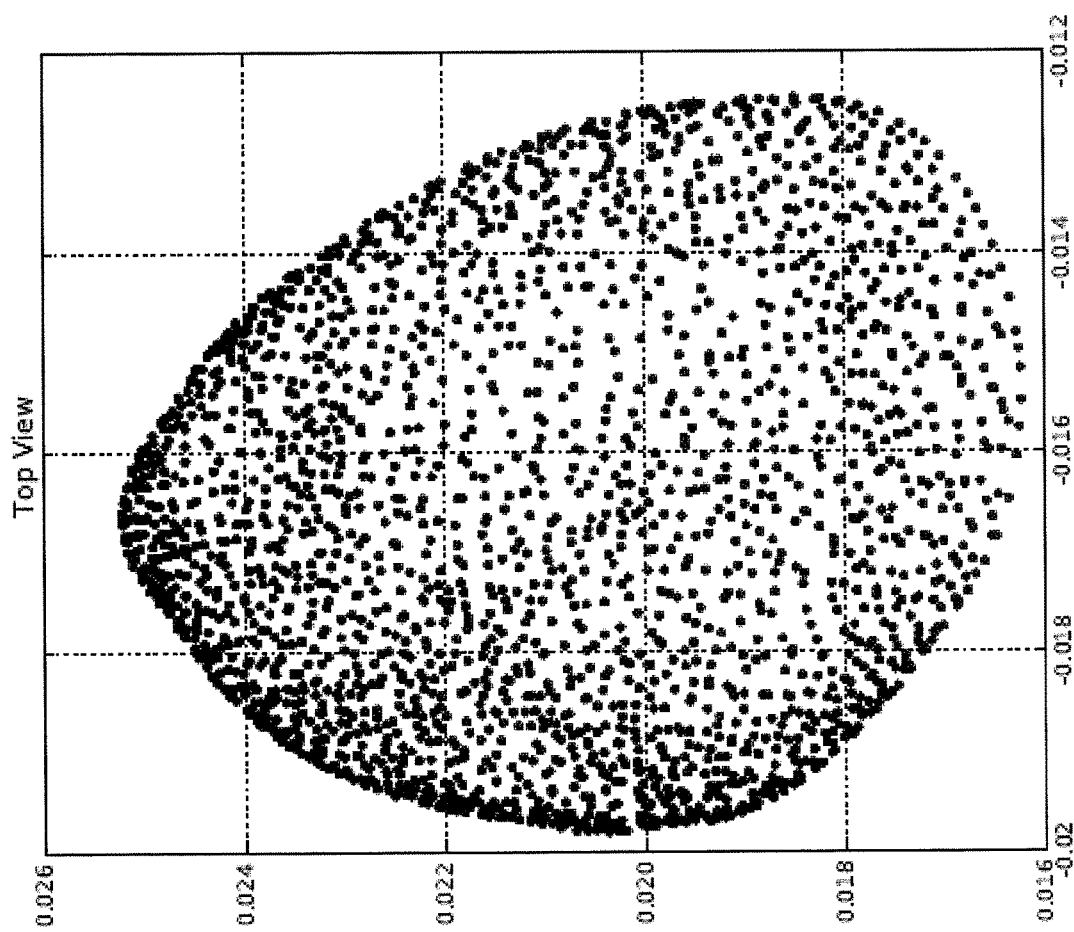
FIGS. 2A, 2B, and 2C are diagrams showing top, front, and side views of samples of an upper, right canine tooth shape.
Figure 2B:
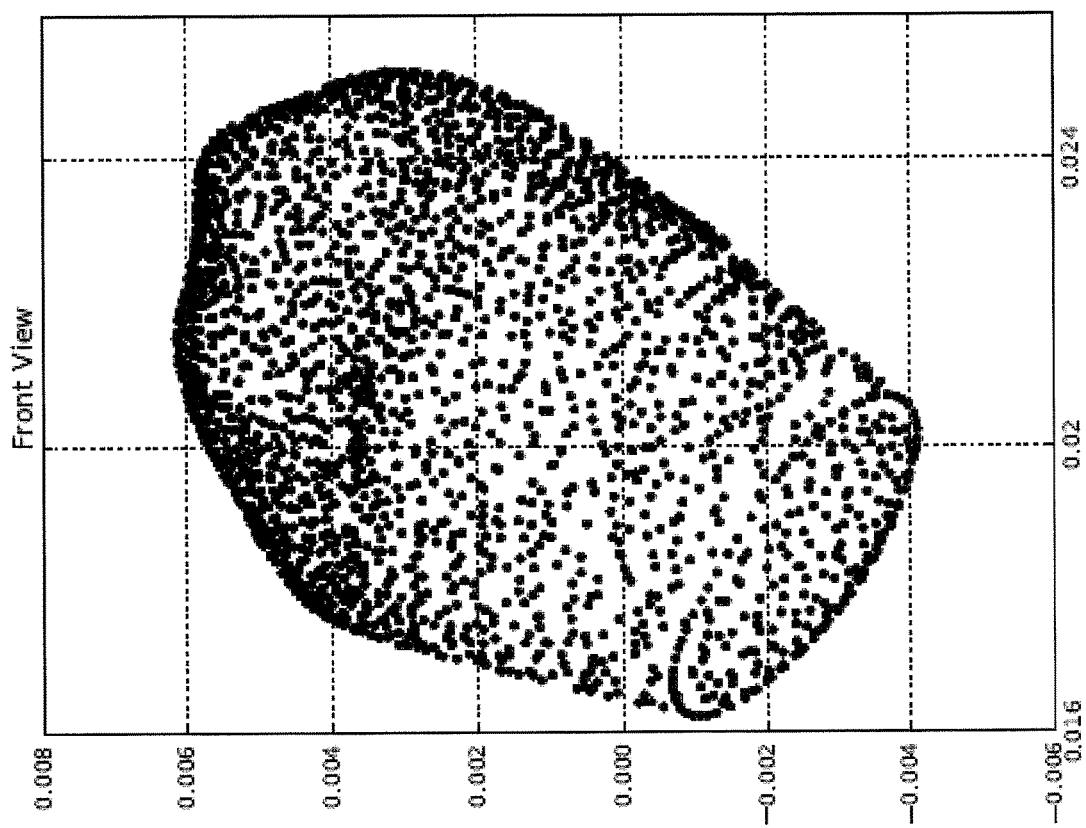
Figure 2C:
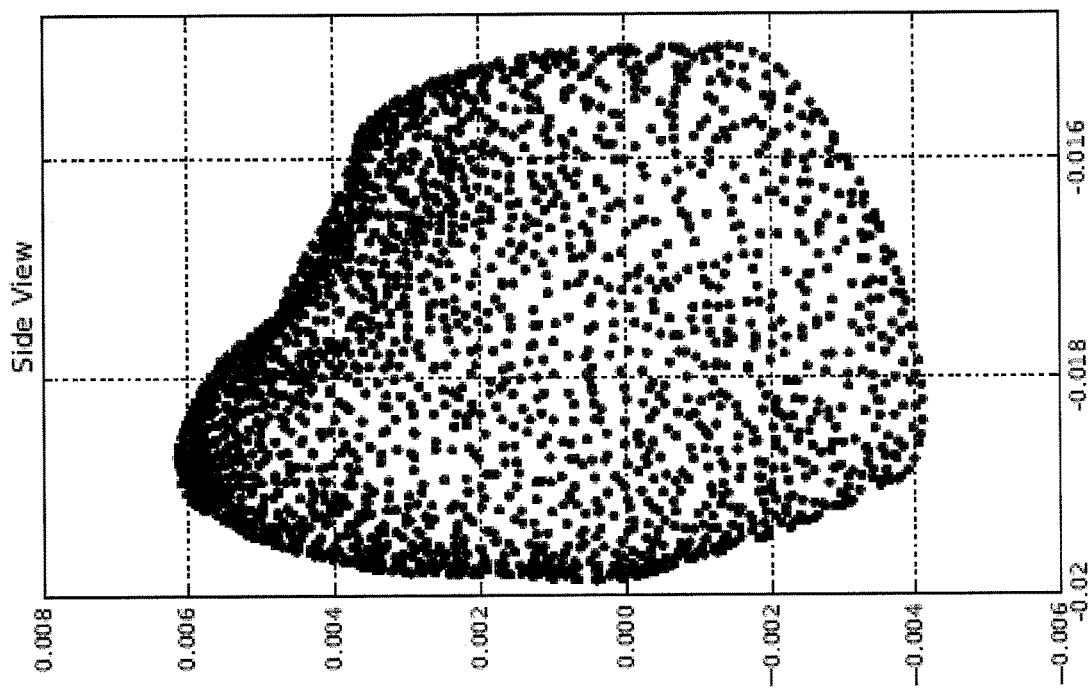

FIGS. 2A, 2B, and 2C show example top, front, and side views of samples of an upper-right canine tooth (tooth 6 in the Universal Numbering System). To generate each 2D view, the 3D descriptors identification engine 122 may have flattened the vertices of the tooth meshes for each of the samples by removing one dimension, so the top view was represented by the X and Y coordinates of the vertices, the front view by the X and Z coordinates, and the side view by the Y and Z coordinates. For each of the orthoscopic views, the mesh is then collapsed into a point cloud. A shape is then drawn around the bounds of each point cloud.

In some implementations, the 3D descriptors identification engine 122 may use a concave bounding shape to model features of each view. The 3D descriptors identification engine 122 may use Algorithm 1 (below) to generate the characteristic, convex bounding shape for each 2D tooth view.

Figure 2F:
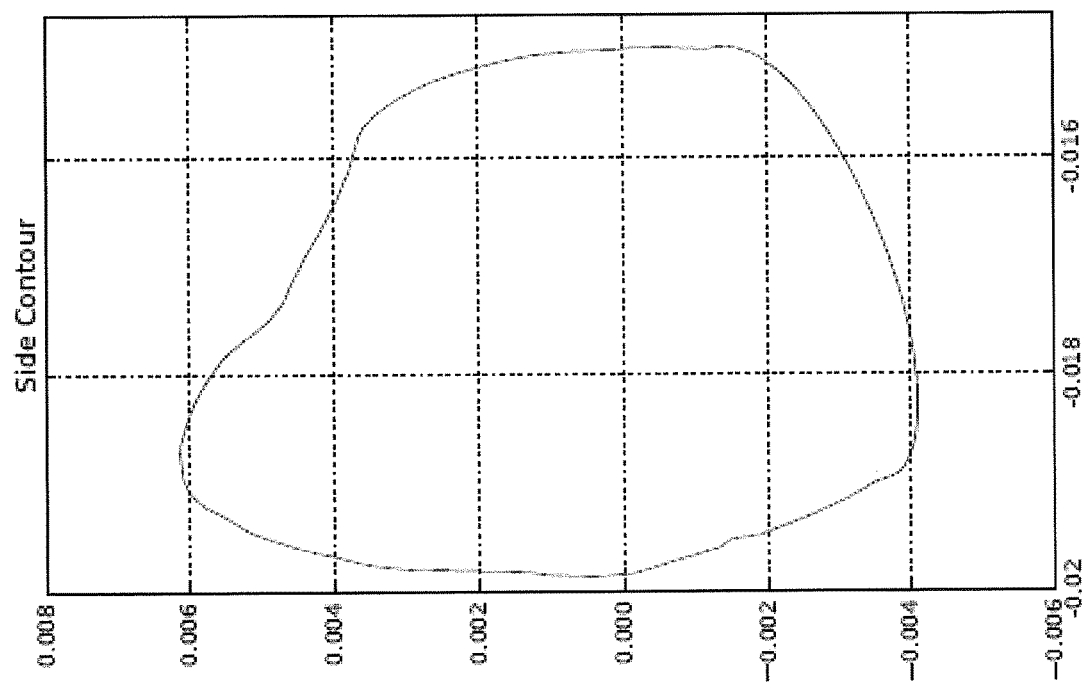

Algorithm 1
Algorithm to generate concave boundary
around a set of points, $\mathcal{P}$ 1. Generate the Dulaunay triangularization $\Delta$ of all points $\mathcal{P}$
2: Identify the boundary as all edges of the triangularization that are only seen once (i.e., those on the outer boundary)
3: Create the list B containing all boundary edges and their lengths
4: Sort B by descending order of length
5: Create result set $r \leftarrow \{\ \}$
5: while B is not empty do
7: $\quad e \leftarrow \text{pop}(B)$
8: $\quad$ if $|e| > \lambda_p$ then
9: $\quad\quad$ find the vertex, v of the triangle opposite to the edge, e
10: $\quad\quad$ remove edge e from the triangularization $\Delta$
11: $\quad\quad$ add the two newly revealed edges ($e_0$, v) and ($e_1$, v) to B ordered by their lengths
12: $\quad$ else
13: $\quad\quad r \leftarrow r \cup \{e\}$
14: $\quad$ end if
15: end while
16: Generate a counter-clockwise polygon of the characteristic bounding shape, based on the edges in r In this example, for purposes of determining the concave bounding shape, the 3D descriptors identification engine 122 may set a length threshold (in this example, $\lambda_p=0{:}0005$) to represent maximum line length for the size of the tooth representations. FIGS. 2D, 2E, and 2F show examples of convex bounding shapes corresponding to the top, front, and side views of FIGS. 2A, 2B, and 2C.

In some implementations, the 3D descriptors identification engine 122 may represent the virtual surface contours using EFDs after creating a concave bounding shape for each orthoscopic view. EFDs have been shown to be good representations of closed shapes, sparsely representing complex feature data. For this method, the 3D descriptors identification engine 122 chose anywhere from 10-30 Fourier descriptors to accurately represent the shapes of the teeth with a minimal number of features.

In some implementations, the 3D descriptors identification engine 122 may use an EFD with a set of four numbers per descriptor (an, bn, cn, dn) along with a location component, ($A_0$, $C_0$), such that the original shape can be represented parametrically as:

$$x(t) = A_0 + \sum_{n=1}^{\infty} a_n \cos \frac{2n\pi t}{T} + b_n \sin \frac{2n\pi t}{T} \quad (1)$$

$$y(t) = C_0 + \sum_{n=1}^{\infty} c_n \cos \frac{2n\pi t}{T} + d_n \sin \frac{2n\pi t}{T} \quad (2)$$

where t ranges from 0 to T (for reconstruction, T can be taken as 1).

After computing the EFD for each view (top, front, side), the 3D descriptors identification engine 122 may normalize the EFD in order to provide rotation and size invariance. In this example, the EFD normalization process may involve moving the shape to the origin, finding the principal axis, rotating it to the X-axis, and scaling the length of the principal axis to ±1.

Depending on the sample size of teeth, this example normalization process can introduce some ambiguity in that each normalized shape can be represented in two rotations that are 180 degrees apart. In a typical classification scheme, this might not be an issue, but each 3D tooth shape in this system is represented by three separate orthoscopic views, each with an arbitrary rotation, yielding eight separate clusters of teeth. In very large sample sizes (e.g. 4,000 to 8,000 samples), the center of each cluster could be identified to find the sample closest to the center. However, with smaller sample sizes (e.g., less than 1500 teeth), each cluster would contain, on average, fewer than 200 shapes, and finding the center of the cluster would prove difficult.

Figure 3:
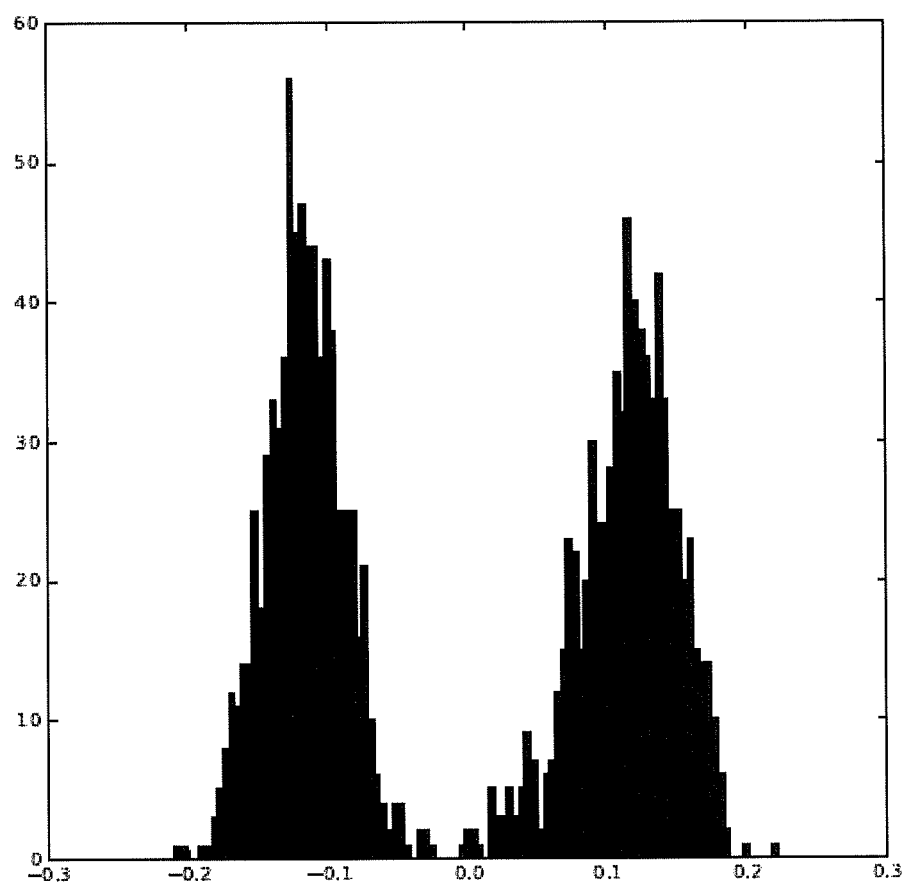
FIGS. 3 and 4 are diagrams showing distributions of the first principal component of one of the orthoscopic EFDs before (FIG. 3) and after (FIG. 4) normalization.
Figure 4:
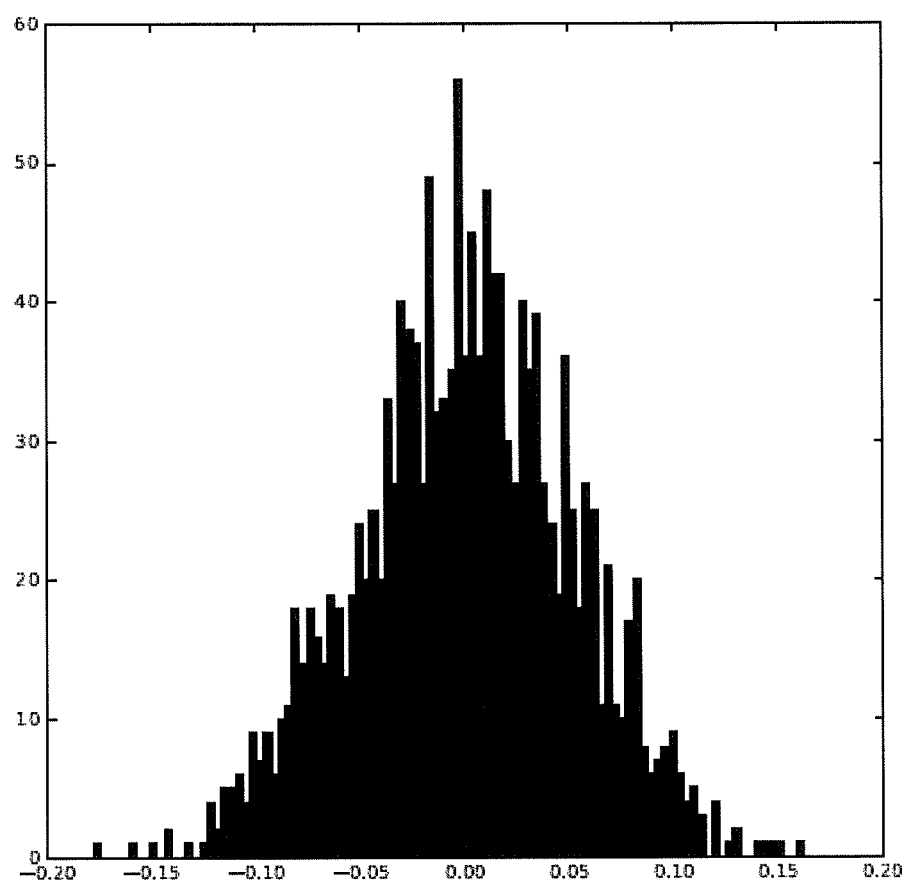

In one embodiment, the 3D descriptors identification engine 122 may present a solution to the rotational ambiguity by computing all of the normalized EFDs, and then for each view (top, front, and side), compute the first principal component of the normalized EFDs. In cases where the first principal component is negative, the 3D descriptors identification engine 122 may rotate normalized descriptors by multiplying each even-numbered descriptor by −1 which corresponds to a 180 rotation in the normalized elliptic Fourier space. FIGS. 3 and 4 show distributions of the first principal component of one of the orthoscopic EFDs before (FIG. 3) and after (FIG. 4) the disambiguation.

In some implementations, the 3D descriptors identification engine 122 represents virtual surface contours using 3D descriptors comprising spherical harmonics. It is noted that spherical harmonics may more accurately characterize the 3D shape of a tooth than other techniques. Spherical harmonic techniques may facilitate computing spherical harmonics for each tooth over a set of normalized radii. These example methods may prove useful in the retrieval of 3D imagery, particularly due to the rotational invariance of a particular 3D virtual representation of a tooth.

As noted, in some implementations, the 3D descriptors identification engine 122 represents virtual surface contours using 3D descriptors comprising spherical harmonics. In some implementations, the spherical harmonics are analogous to Fourier descriptors, except that they operate on functions defined over a sphere. In general, any function $f(r, \theta, \phi)$ can be represented as an infinite sum of spherical harmonics:

$$f(r, \theta, \varphi) = \sum_{\ell=0}^{\infty} \sum_{m=-\ell}^{\ell} f_\ell^m r^\ell Y_\ell^m(\theta, \varphi) \quad (3)$$

where $f_l$ is a constant, $r_l$ is a scaling factor, $$Y_l^m(\theta, \varphi) = \sqrt{\frac{(2\ell+1)}{4\pi}\frac{(\ell-m)!}{(\ell+m)!}}\, P_\ell^m(\cos\theta)e^{im\varphi} \quad (4)$$

and $P_l^m$ is the associated polynomial defined as:

$$P_\ell^m(x) = \frac{(-1)^m}{2^\ell \ell!}(1-x^2)^{m/2}\frac{d^{\ell+m}}{dx^{\ell+m}}(x^2-1)^\ell \quad (5)$$

In some implementations, the number of harmonics can be truncated to some finite number large enough to capture the frequency characteristics of the original function.

The 3D descriptors identification engine 122 may use multiple approaches to compute the spherical harmonics for a particular tooth. Under a first approach, the 3D descriptors identification engine 122 may normalize a 3D virtual representation of a tooth by centering and scaling so that the size of the longest axis of the 3D virtual representation of the tooth (usually the Z axis) ranges from −1 to 1. Once the 3D descriptors identification engine 122 has normalized the 3D virtual representation of the tooth, the 3D descriptors identification engine 122 may voxelize the surface of the tooth into an array of an arbitrary size (e.g., size 64×64×64 used in some examples). The 3D descriptors identification engine 122 may create a voxelized sphere, S, of radius r, using any spatial parameters, including but not limited to polar coordinates (r, θ, φ) where r varies between two arbitrary integers (in some examples, from 1 to 32). The 3D descriptors identification engine 122 may further use the coordinates of S to index into the voxelization of the tooth shape. For each point in S where the voxel is set to 1 (i.e., which is a discretized location of the tooth exterior), 3D descriptors identification engine 122 may compute a sum of the spherical harmonics for a given frequency, F. By varying the range of F from, e.g., 1 to 16 and the radius r from, e.g., 1 to 32, the 3D descriptors identification engine 122 may create a spherical harmonic based signature for the tooth in question. An example of this process is described in detail in Algorithm 2, below:

Algorithm 2
Algorithm to generate a spherical-harmonic signature based on [3]

1: Create empty signature, sig ← array(32, 16)
2: Find the center of the tooth, c
3: Center the tooth, T, by updating each vertex v ← v − c; ∀v ∈ T
4: Find the length of the tooth in each dimension, $l_x, l_y, l_x$ ← max($v_x, v_y, v_x$) − min($v_x, v_y, v_x$)
5: Find the scale of the tooth as L ← max($l_x, l_y, l_x$)
6: Scale the tooth, v ← v/L; ∀v ∈ T
7: Create the voxel array, V ← zeros(64 × 64 × 64)
8: for v ∈ T do
9:     p ← int(32 * v)
10:    V[p] ← 1
11: end for
12: for r ← 1 ... 32 do
13:    Generate voxelized sphere, S with radius r
14:    for F ← 1 ... 16 do
15:      sig(r, F) ← $\Sigma_{s\in S} \Sigma_{m=-F}^{F}$ V[s]$Y_F^m$(s$\theta$, s$\phi$)
16:    end for
17: end for Under a second approach, the 3D descriptors identification engine 122 may avoid voxelization of the surface of the 3D object. Once again, the 3D descriptors identification engine 122 may compute the spherical harmonic signature of a 3D virtual representation of a tooth by centering the 3D virtual representation of the tooth to normalize it. Then, in some implementations, the 3D descriptors identification engine 122 may convert one or more of the vertices from one set of spatial parameters to another set of spatial parameters (e.g., from Cartesian coordinates (x, y, z) to spherical coordinates (r, θ, φ)). The 3D descriptors identification engine 122 may implement a scaling process to normalize the tooth so that the maximum r value is a specific value (e.g., 1). For a first integer set (e.g., 32) of radii ranges, from one value to another (e.g., 0 to 1), the 3D descriptors identification engine 122 can select all vertices within a given radii range. The 3D descriptors identification engine 122 may further compute the sum of the spherical harmonics for each frequency F. By varying the range of F from 1 to 16 and the radius range r from 0 to 1, 3D descriptors identification engine 122 may create a spherical harmonic based signature.

Different teeth representations can have a differing number of vertices. In the first approach, the 3D descriptors identification engine 122 may normalize the number of points in the spherical harmonic signature through the voxelization process. In the second approach, the 3D descriptors identification engine 122 may divide the signature by the number of vertices in each radius range, as described in more detail in Algorithm 3 below:

Algorithm 3
Algorithm to generate a spherical-harmonic signature without voxelization 1: Create empty signature, sig ← array (32,16)
2: Find the center of the tooth, c
3: Center the tooth, T, by updating each vertex v ← v − c; ∀v ∈ T
4: Convert each vertex from Cartesian coordinates to spherical coordinates
5: Find the scale of the tooth as L ← max($v_r$); ∀v ∈ T
6: Scale the tooth, v ← v/L; ∀v ∈ T
7: Generate the radius ranges R = 0, 1/32, 2/32, ... , 1
8: for i ← 0 ... 31 do
9:    S ← {v ∈ T | R[i] < $v_r$ ≤ R[i + 1]}
10:   for F ← 1 ... 16 do
11:     sig(r, F) ← $\Sigma_{s\in S}\Sigma_{m=-F}^{F} Y_F^m$(s$\theta$, s$\phi$)
12:   end for
13:   sig(r, ...) ← $\frac{1}{|S|}$sig(r, ...)
14: end for The descriptor distance analysis engine 124 may implement one or more automated agents configured to identify descriptor distances between 3D descriptors in the 3D descriptor space formed by the 3D descriptors for a specific tooth type. In some implementations, the descriptor distance analysis engine 124 identifies differences in descriptor locations of specific 3D descriptors. The descriptor distance analysis engine 124 may further identify a minimum distance for a given 3D descriptor space of a tooth type.

In some implementations (e.g., some in which 3D descriptors comprise EFDs), the descriptor distance analysis engine 124 may perform a principal component analysis (PCA) to identify descriptor distances; the descriptor distance analysis engine 124 may identify which PCAs of 3D descriptors are minimum, are 0, or are substantially 0. In implementations (e.g., some in which 3D descriptors comprise spherical harmonic representations), the descriptor distance analysis engine 124 may identify Euclidean distance(s) between 3D descriptors and/or taking l2 norm(s) of rows of matrices embodied in the 3D descriptor datastore 114. The descriptor distance analysis engine 124 may operate to provide descriptor distances between 3D descriptors to other modules, such as the representative 3D descriptor assignment engine 126.

The representative 3D descriptor assignment engine 126 may implement one or more automated agents configured to identify a representative 3D descriptor for a tooth type. In some implementations, the representative 3D descriptor assignment engine 126 bases the representative 3D descriptor on descriptor distances. As an example, the representative 3D descriptor assignment engine 126 may select a 3D descriptor having a minimum distance from other 3D descriptors corresponding to the same tooth type as a representative 3D descriptor. In some implementations, the representative 3D descriptor may correspond to a representation of an "average" or "optimal" shape for a tooth type.

In some implementations, the representative 3D descriptor assignment engine facilitates ranking a set of teeth in order of normality. For example, the top 10 "most representative" teeth for a sample set of teeth, as found by the representative 3D descriptor assignment engine 126 via EFDs, can be seen in Table 1, in which the score for each individual sample is listed in the "Score" column and the digital file linking to the individual tooth sample is listed in the "STL File" column:

TABLE 1

"Most representative" teeth for EFD

| Score | STL File |
|---|---|
| 0.0026 | <Redacted> |
| 0.0029 | <Redacted> |
| 0.0030 | <Redacted> |
| 0.0033 | <Redacted> |
| 0.0034 | <Redacted> |
| 0.0034 | <Redacted> |
| 0.0035 | <Redacted> |
| 0.0035 | <Redacted> |
| 0.0037 | <Redacted> |
| 0.0038 | <Redacted> |

Likewise, the top 10 "least representative" teeth found by the representative 3D descriptor assignment engine 126 via the EFD method for a sample set of teeth can be seen in Table 2, in which the score for each individual sample is listed in the "Score" column and the digital file linking to the individual tooth sample is listed in the "STL File" column:

TABLE 2

"Least representative" teeth for EFD

| Score | STL File |
|---|---|
| 0.0650 | <Redacted> |
| 0.0651 | <Redacted> |
| 0.0673 | <Redacted> |
| 0.0677 | <Redacted> |
| 0.0683 | <Redacted> |
| 0.0699 | <Redacted> |
| 0.0709 | <Redacted> |
| 0.0765 | <Redacted> |

TABLE 2-continued

"Least representative" teeth for EFD

| Score | STL File |
|---|---|
| 0.0778 | <Redacted> |
| 0.0791 | <Redacted> |

Figure 5:
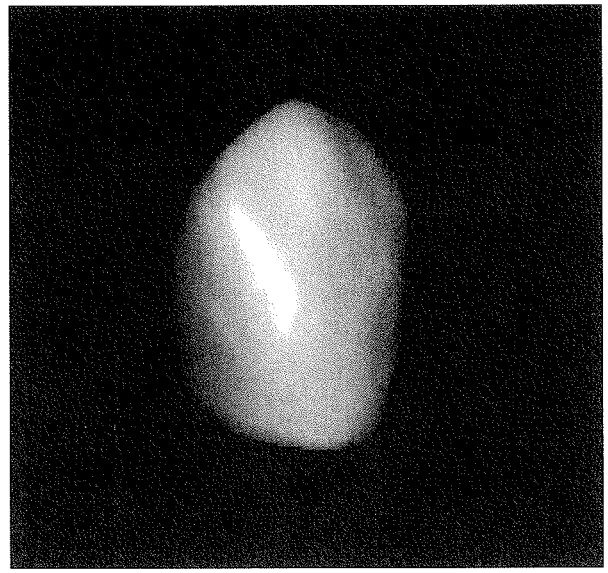
FIG. 5 is a diagram showing the "most average" tooth shape resulting from the EFD method.
Figure 6:
FIG. 6 is a diagram showing the "least average" tooth shape resulting from the EFD method.

The "most representative" tooth resulting from an example of an EFD method performed by the representative 3D descriptor assignment engine 126 is shown in FIG. 5, and the "least representative" tooth resulting from an example of an EFD method performed by the representative 3D descriptor assignment engine 126 is shown in FIG. 6.

Figure 7:
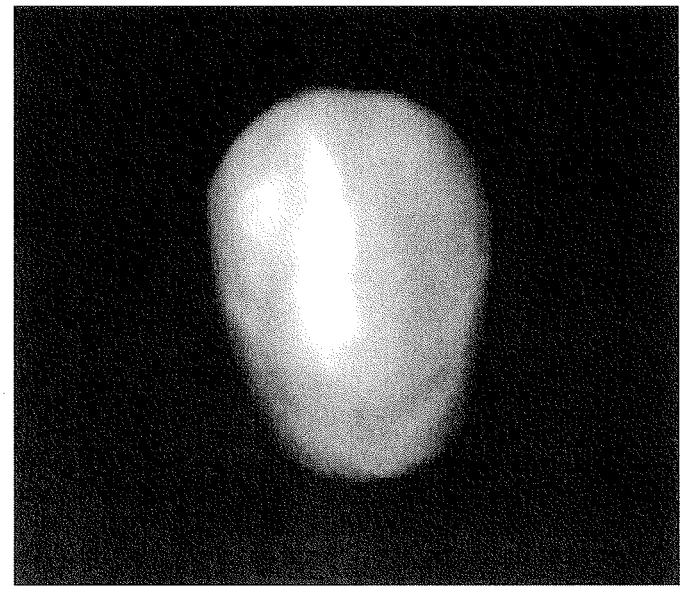
FIG. 7 is a diagram showing the "most average" tooth shape resulting from the spherical harmonics method.
Figure 8:
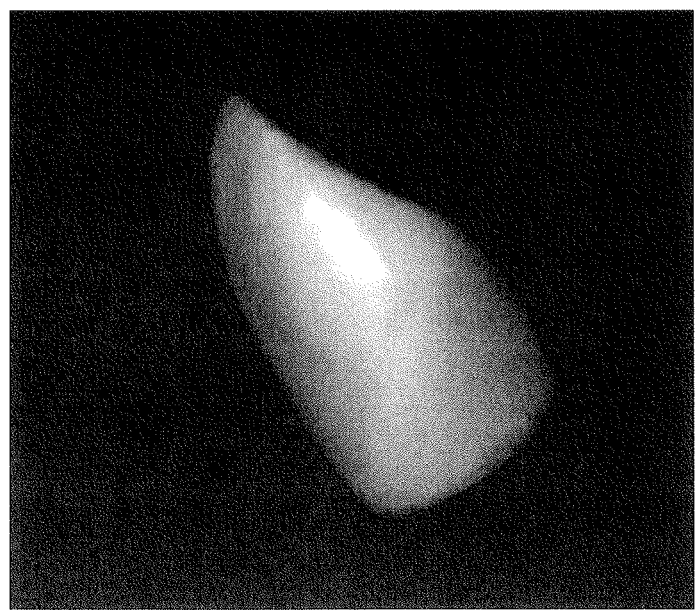
FIG. 8 is a diagram showing the "least average" tooth shape resulting from the spherical harmonics method.

In a similar manner, in some implementations, the representative 3D descriptor assignment engine 126 may determine the top 10 "most average" and "least average" teeth can be determined for the spherical harmonic method (see Tables 3 and 4, respectively) with the best and worst teeth seen in FIGS. 7 and 8.

TABLE 3

"Most representative" teeth for spherical harmonics

| Score | STL File |
|---|---|
| 71.3577326 | <Redacted> |
| 73.3774578 | <Redacted> |
| 75.9055045 | <Redacted> |
| 76.2979777 | <Redacted> |
| 76.6726197 | <Redacted> |
| 77.5958384 | <Redacted> |
| 77.9117356 | <Redacted> |
| 78.1144551 | <Redacted> |
| 78.2615031 | <Redacted> |
| 78.4348530 | <Redacted> |

TABLE 4

"Least representative" teeth for spherical harmonics

| Score | STL File |
|---|---|
| 123.1364272 | <Redacted> |
| 123.4200720 | <Redacted> |
| 123.6039287 | <Redacted> |
| 123.7421478 | <Redacted> |
| 124.6166645 | <Redacted> |
| 127.0011129 | <Redacted> |
| 128.8748830 | <Redacted> |
| 130.7281688 | <Redacted> |
| 134.2232485 | <Redacted> |
| 139.0518147 | <Redacted> |

As noted herein, the representative 3D descriptor assignment engine 126 may store a representative 3D descriptor for a tooth type in the 3D descriptor datastore 104. The representative 3D descriptor may be indexed by tooth type so that it can be used to identify the shape and/or size of a portion of an aligner to accommodate an at least partially un-erupted tooth.

Figure 1C:
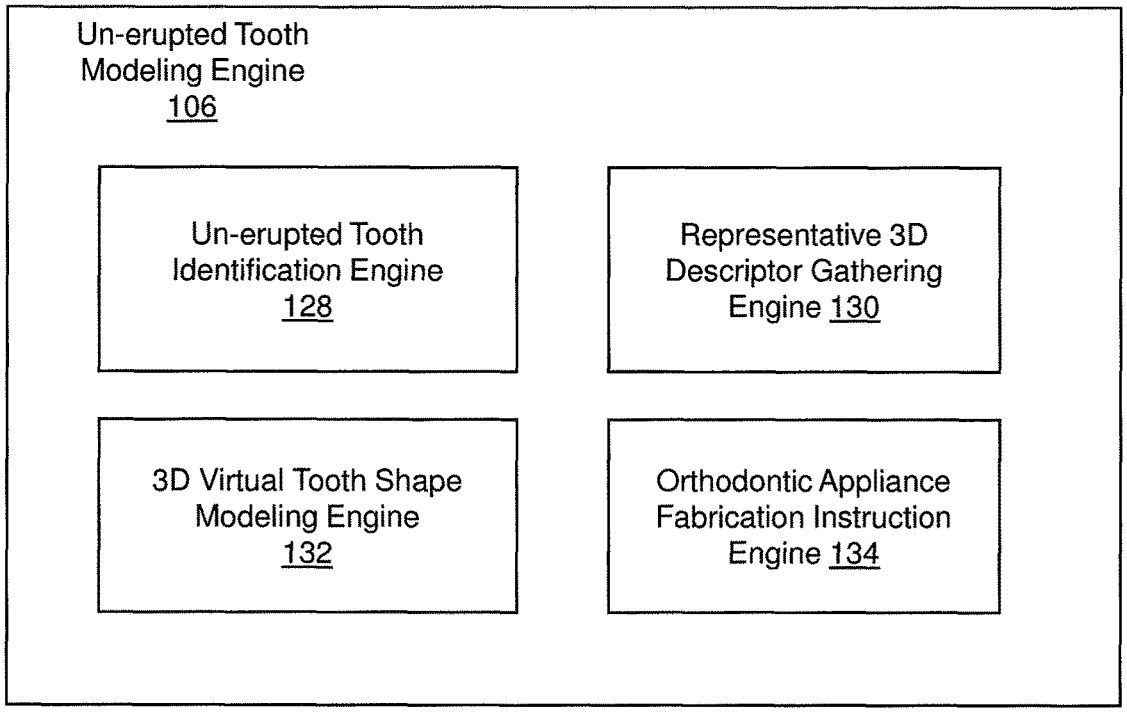
FIG. 1C is a diagram showing an example of un-erupted tooth modeling engine(s).

FIG. 1C is a diagram showing an example of the un-erupted tooth modeling engine(s) 106. The un-erupted tooth modeling engine(s) 106 may include an un-erupted tooth identification engine 128, a representative 3D descriptor gathering engine 130, a 3D virtual shape modeling engine 132, and an orthodontic appliance (e.g., aligner, palatal expander, etc.) fabrication instruction engine 134. One or more of the modules of the un-erupted tooth modeling engine(s) 106 may be coupled to one another (e.g., through the example couplings shown in FIG. 1C) or to modules not explicitly shown in FIG. 1B.

The un-erupted tooth identification engine 128 may implement one or more automated agents configured to identify one or more un-erupted teeth to be modeled. In some implementations, the un-erupted tooth identification engine 128 receives anatomical tooth identifiers of un-erupted teeth through manual input or through an automated system. In an implementation, the un-erupted tooth identification engine 128 may receive tooth numbers and/or character strings input by a medical professional corresponding to an un-erupted tooth of a patient. In various implementations, the un-erupted tooth identification engine 128 may receive the results of a scan (e.g., an optical scan) or a virtual representation of a dental mold that identifies un-erupted teeth. The un-erupted tooth identification engine 128 may provide identifiers of one or more teeth to other modules, such as the representative 3D descriptor gathering engine 130. In some implementations, this may involve the un-erupted tooth identification engine 128 providing anatomical tooth identifiers. This can be performed in other ways as well.

The representative 3D descriptor gathering engine 130 may implement one or more automated agents configured to gather one or more representative 3D descriptor for a tooth type from the 3D descriptor datastore 114. The representative 3D descriptor gathering engine 130 may use anatomical tooth identifiers to gather what the automated tooth model learning engine(s) 104 stored in the 3D descriptor datastore 114 as a representative 3D descriptor for a tooth type. The representative 3D descriptor gathering engine 130 may provide the representative 3D descriptor to other modules, such as the 3D virtual tooth shape modeling engine 132.

The 3D virtual tooth shape modeling engine 132 may implement one or more automated agents configured to identify visual parameters of a representative tooth of a tooth type using the representative 3D descriptor for the tooth type. The 3D virtual tooth shape modeling engine 132 may implement one or more specialized graphics rendering engines. In some implementations, the representative 3D virtual tooth shape modeling engine 132 forms a virtual 3D tooth shape for an at least partially un-erupted tooth using the 3D descriptor for the tooth type associated with the at least partially un-erupted tooth. The virtual 3D tooth shape may include virtual contours that represent the surfaces of the at least partially un-erupted tooth. In some implementations, the 3D virtual tooth shape modeling engine 132 may scale the 3D virtual tooth shape to match the anticipated size of the at least partially un-erupted tooth of the patient.

The aligner fabrication instruction engine 134 may implement one or more automated agents configured to provide instructions to form parts of aligners using the virtual 3D tooth shape. The aligner fabrication instruction engine 134 may provide the orthodontic appliance fabrication engine(s) 108 with instructions to 3D print and/or thermoform aligners, in various implementations.

Example Flowcharts of Methods of Operation

Figure 1D:
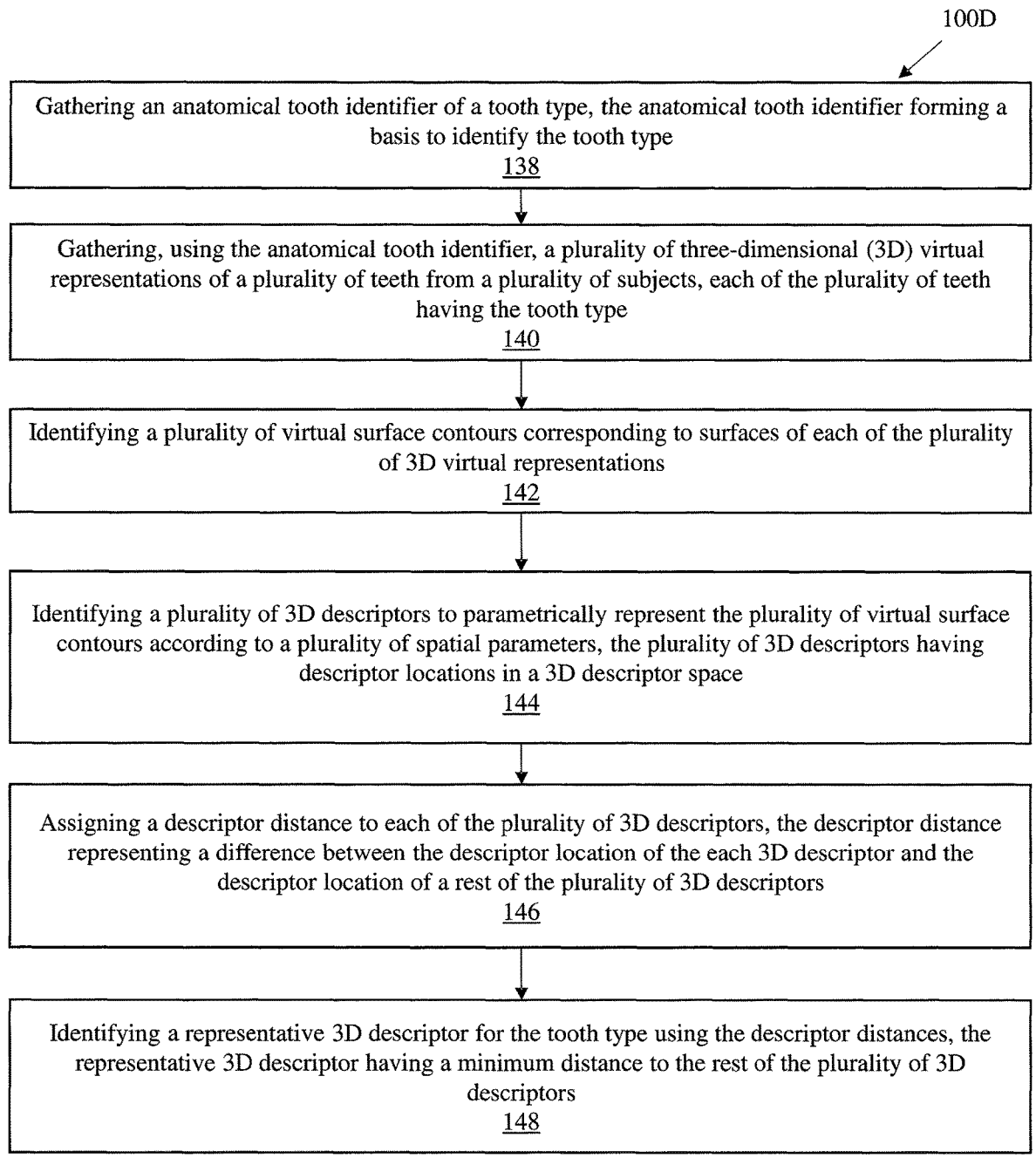
FIG. 1D is a flowchart of an example of a method of identifying a representative three-dimensional descriptor of a tooth type.

FIG. 1D is a flowchart of an example of a method 100D of identifying a representative three-dimensional descriptor of a tooth type. The method 100D is discussed in conjunction with the structures of the automated tooth model learning engine(s) 104. It is noted the method 100D may have fewer or additional operations, and that structures other than the automated tooth model learning engine(s) 104 may perform operations of the method 100D.

At an operation 138, an anatomical tooth identifier of a tooth type may be gathered. In some implementations, the anatomical tooth identifier forms a basis to identify the tooth type. The anatomical tooth identifier may comprise a tooth number, a character string, and/or graphical data corresponding to the tooth type. As noted herein, the tooth type identifier gathering engine 116 may gather an anatomical tooth identifier as part of a tooth model automated learning process for that tooth type. In various implementations, the tooth type identifier gathering engine 116 may sequentially input two or more tooth types so that representative 3D descriptors for those tooth types can be learned through the automated systems described herein.

At an operation 140, a plurality of three-dimensional (3D) virtual representations of a plurality of teeth from a plurality of subjects may be gathered using the anatomical tooth identifier. Each of the plurality of teeth may have the tooth type. The 3D virtual representation gathering engine 116 may gather from the 3D virtual representation datastore 112 two or more 3D representations of a plurality of teeth from a plurality of subjects may be gathered using the anatomical tooth identifier. As noted herein, the 3D virtual representation may have one or more virtual surfaces that model physical surfaces of teeth on images captured from/modeled by the plurality of subjects.

At an operation 142, a plurality of virtual surface contours corresponding to surfaces of each of the plurality of 3D virtual representations may be identified. The virtual surface contour identification engine 118 may perform an analysis of 3D virtual representations of different teeth of a tooth type to identify portions of the 3D virtual representations that indicate separation from open space. One-dimensional curves, and two-dimensional contours may be mapped out and/or stored.

At an operation 144, a plurality of 3D descriptors to parametrically represent the plurality of virtual surface contours according to a plurality of spatial parameters may be identified. In some implementations, the plurality of 3D descriptors have descriptor locations in a 3D descriptor space. The 3D descriptor identification engine 120 may identify a plurality of 3D descriptors to parametrically represent the plurality of virtual surface contours according to a plurality of spatial parameters. As noted herein, in some implementations, EFDs, spherical harmonic descriptors involving voxelized spheres, and/or spherical harmonic descriptors involving non-voxelized spheres, among other descriptors, may be used to parametrically represent the plurality of virtual surface contours according to a plurality of spatial parameters.

At an operation 146, a descriptor distance may be assigned to each of the plurality of 3D descriptors. In various implementations, the descriptor distance may represent a difference between the descriptor location one of the 3D descriptors and the descriptor location of rest of the plurality of 3D descriptors. The descriptor distance analysis engine 122 may, e.g., use appropriate descriptor distance techniques (as discussed herein) to identify distances between specific 3D descriptors and other 3D descriptors for a tooth type.

At an operation 148, a representative 3D descriptor for the tooth type may be identified using the descriptor distances. In some implementations, the representative 3D descriptor may have a minimum distance to the rest of the plurality of 3D descriptors. As an example, the representative 3D descriptor may reside closer in the 3D descriptor space to other in that 3D descriptor space than any of the other 3D descriptors reside to any of the 3D descriptors in that 3D descriptor space. The representative 3D descriptor assignment engine 124 may identify such a representative 3D descriptor for a tooth type and may store such a representative 3D descriptor in the 3D descriptor datastore 114.

Figure 1E:
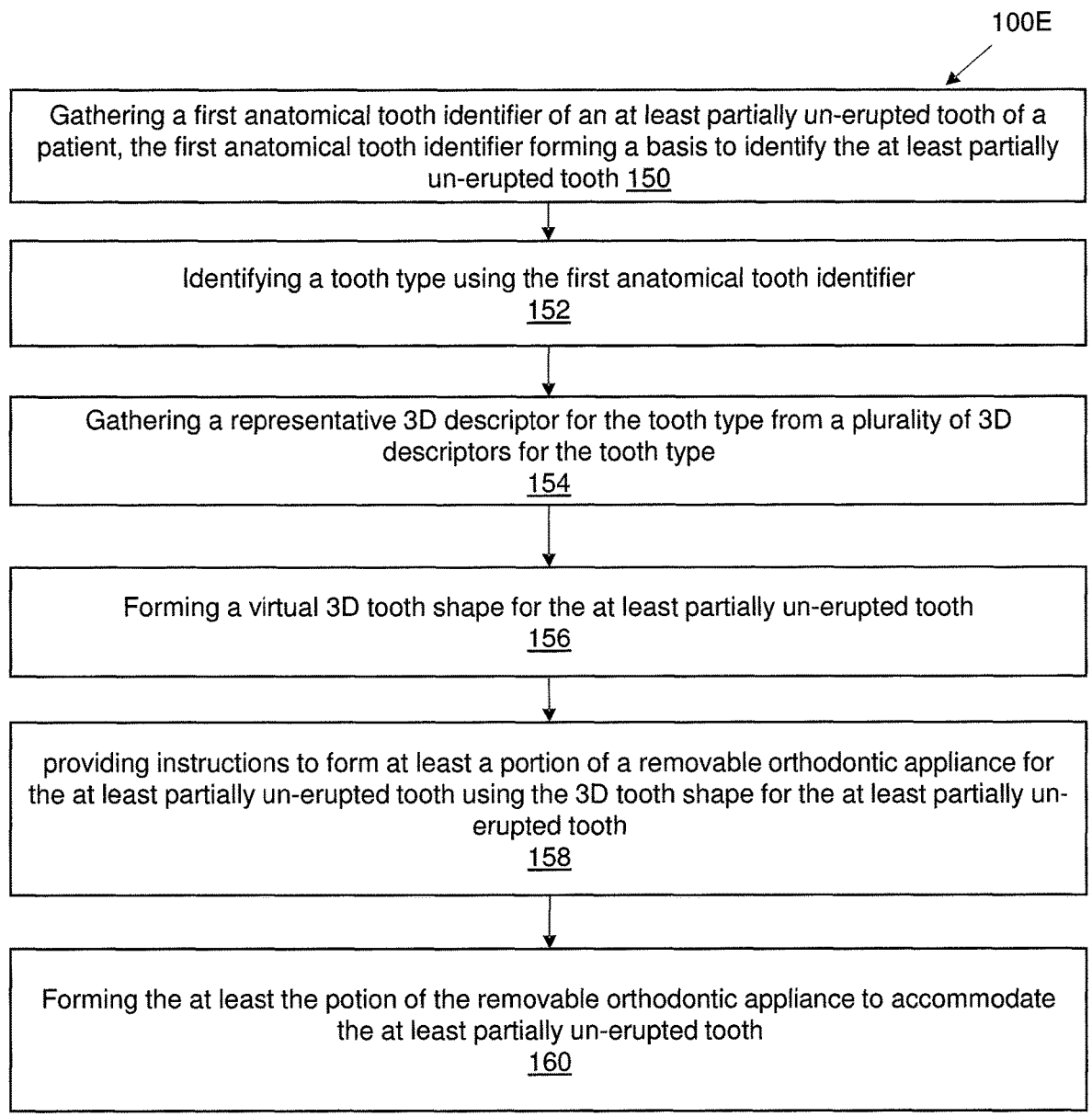
FIG. 1E is a flowchart of an example of a method of forming at least a portion of a removable orthodontic appliance for an un-erupted tooth.

FIG. 1E is a flowchart of an example of a method 100E of forming at least a portion of a removable orthodontic appliance for an un-erupted tooth. The method 100E is discussed in conjunction with the structures of the un-erupted tooth modeling engine 106. It is noted the method 100E may have fewer or additional operations, and that structures other than the un-erupted tooth modeling engine 106 may perform operations of the method 100E.

At an operation 150, a first anatomical tooth identifier of an at least partially un-erupted tooth of a patient may be gathered. In some implementations, the first anatomical tooth identifier forms a basis to identify the at least partially un-erupted tooth 150. The un-erupted tooth identification engine 130 may gather a first anatomical tooth identifier of an at least partially un-erupted tooth of a patient in some implementations. The first anatomical tooth identifier may comprise a tooth number, a character string, and/or graphical data corresponding to the tooth type. In some implementations, the operation 150 may be part of identifying whether a patient's arch contains at least partially un-erupted teeth. Such identification may be made manually or automatically (e.g., using a computing device). For example, identification can be made by a dental practitioner evaluating the patient's teeth or arch, or alternatively, can be performed by a computing system automatically by evaluating data (such as a scan or dental impression) of the patient's teeth or arch.

At an operation 152, a tooth type may be identified using the first anatomical tooth identifier. In some implementations, the un-erupted tooth identification engine 130 may identify a tooth type using the first anatomical tooth identifier. The un-erupted tooth identification engine 130 may evaluate the tooth type using data from the tooth type identifier datastore 110.

At an operation 154, a representative 3D descriptor for the tooth type may be gathered from a plurality of 3D descriptors for the tooth type. In various implementations, the representative 3D descriptor gathering engine 12 may gather a representative 3D descriptor for a tooth type from the 3D descriptor datastore 114. As noted herein, the 3D descriptor datastore 114 may have been populated by the tooth model automated learning engine(s) 104 using the automated learning techniques described further herein.

At an operation 156, a virtual 3D tooth shape for the at least partially un-erupted tooth may be formed. In various implementations, the 3D virtual tooth shape modeling engine 134 may form a virtual 3D tooth shape for the at least partially un-erupted tooth. This may involve providing instructions to one or more graphics engines to render the virtual 3D tooth shape and/or parameters of the virtual 3D tooth shape.

At an operation 158, instructions to form at least a portion of a removable orthodontic appliance for the at least partially un-erupted tooth using the virtual 3D tooth shape for the at least partially un-erupted tooth may be provided. The aligner fabrication engine 136 may translate the virtual 3D tooth shape into specific parameters of a removable orthodontic appliance for the at least partially un-erupted tooth.

At an operation 160, the at least the portion of the removable orthodontic appliance to accommodate the at least partially un-erupted tooth may be formed. The orthodontic appliance fabrication engine(s) 108 may form relevant portions of the removable orthodontic appliance using various techniques, e.g., 3D printing, thermoforming, etc. Advantageously, the portion of the aligner will appear natural and will provide a secure yet comfortable fit for an at least partially un-erupted tooth. The methods herein allow identification of a representative tooth shape for use in orthodontic applications before all of the patient's permanent teeth have erupted. As noted herein, some implementations use orthoscopic views, elliptic Fourier descriptors, and principal component analysis. Some implementations use computing a three dimensional signature using spherical harmonics. The methods described herein can be integrated into an orthodontic treatment plan when a patient has been identified as having one or more un-erupted or erupting teeth.

Figure 1F:
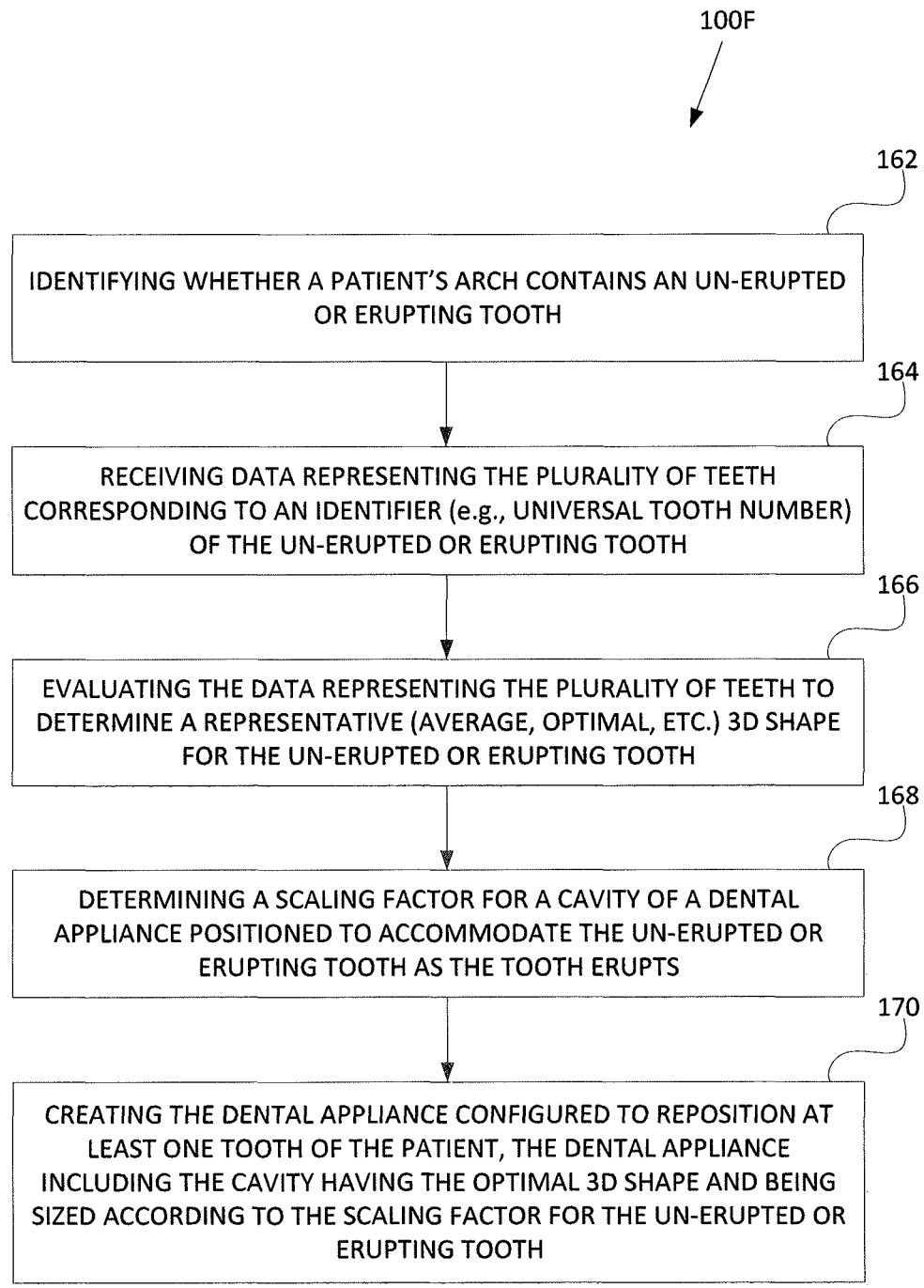
FIG. 1F is a flowchart of an example of a method for accommodating an un-erupted or erupting tooth during a proposed orthodontic treatment.

FIG. 1F is a flowchart of an example of one method of accommodating an at least partially un-erupted tooth during a proposed orthodontic treatment. In FIG. 1F, the method 100F may initially include identifying (e.g., via computing device or manually) whether a patient's arch contains an un-erupted or erupting tooth 162. The identification can be performed by a dental practitioner and directly inputted into the computing device, or can be identified by the computing device itself by evaluating data representing the patient's arch (e.g., a scan or dental impression of the patient).

The method can further include receiving, via the computing device, data representing a plurality of teeth corresponding to a universal tooth number of the un-erupted or erupting tooth 164. In some embodiments, the data can be generated by scanning a plurality of samples of teeth with a 3D scanner or obtaining dental impressions of a plurality of samples of teeth. The data can include information regarding the shape, size, and orientation for each of the teeth in the Universal Numbering System.

In any of the apparatuses and methods described herein, multiple samples of teeth corresponding to each tooth number of the Universal Numbering System can be evaluated to compute a representative 3D representation for each tooth number. As used herein, "universal tooth number" refers to a specific tooth within the Universal Numbering System of dental notation. For example, a tooth having a "universal tooth number" of "Tooth 6" can refer to the upper-right canine tooth. For purposes of the disclosure herein, ~1500 samples of the upper-right canine tooth, Tooth 6 in the Universal Numbering System, were scanned (either directly or from a dental impression) and evaluated to determine a representative3D representation of an upper-right canine tooth.

It should be understood the methods and techniques used herein to determine the representative tooth can be applied to any tooth in the Universal Numbering System, and that any number of samples can be evaluated to determine the representative tooth. Once the representative shape is determined for each tooth, the shapes can be scaled in size for use in orthodontic aligners where the patient's permanent teeth have not all yet erupted.

Returning to FIG. 1F, the method can further include evaluating the data representing the plurality of teeth (e.g., with a technique) to determine an optimal 3D shape for the un-erupted or erupting teeth after they have fully erupted 166. This estimation may be done in any appropriate manner, including using any appropriate technique, as will be described in greater detail herein. For example, in one embodiment the evaluating step can comprise the 2D Elliptic Fourier Descriptors method. The evaluating step can include the use of a Spherical Harmonics method. For example, a modeling technique may include generating two-dimensional top, front, and side views from the data representing the plurality of teeth, and representing the convex bounding shape for each two-dimensional top, front, and side view using elliptic Fourier descriptors. The modeling technique can further comprise computing a principal component analysis to find the optimal 3D shape for the cavity from the data representing the plurality of teeth.

The modeling technique may include summing spherical harmonics for each point of a voxelized sphere over a specific frequency range to compute a spherical harmonic signature for each tooth. The modeling technique can further comprise computing a Euclidean distance between each tooth's spherical harmonic signature to find the optimal 3D shape for the cavity from the data representing the plurality of teeth.

Any of these methods can further include determining a scaling factor (e.g., via the computing device) for a cavity of a dental appliance positioned to accommodate the un-erupted or erupting tooth as the tooth erupts 168. The scaling factor may allow the optimal 3D shape to be scaled in size for use in an orthodontic aligner.

Any of these methods can further include creating the dental appliance configured to reposition at least one tooth of the patient 170. The dental appliance may include a cavity having the optimal 3D shape and being sized according to the scaling factor for the un-erupted or erupting tooth. A dental appliance (or series of dental appliances) can be fabricated according to the data processing system 500 described in greater detail below.

As mentioned above the methods and apparatuses (e.g., systems, devices, software, firmware, etc.) described herein may generally include evaluating data to determine a 3D shape for the un-erupted or erupting shape. Examples (and exemplary techniques) of performing this evaluation are described below. For example, a technique for evaluating data representing a plurality of teeth with Elliptic Fourier Descriptors to determine an optimal 3D shape for a patient's un-erupted or erupting teeth after they have fully erupted is provided.

Figure 9:
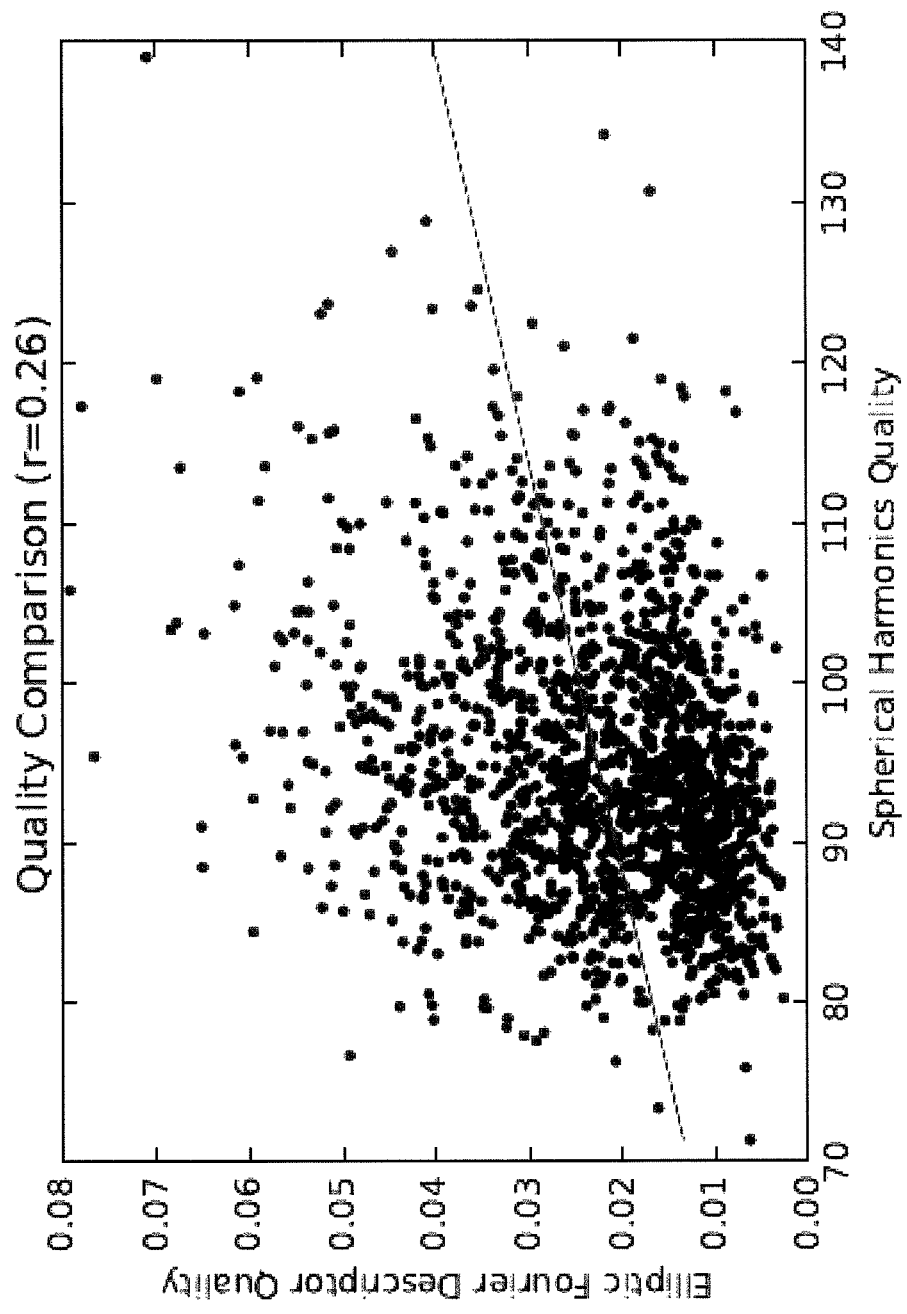
FIG. 9 is a diagram comparing the quality of tooth shapes selected using the EFD and spherical harmonics methods.

FIG. 9 compares the quality of the teeth provided by both the EFD and spherical harmonics solutions, shown on the X and Y axes. As can be seen in FIG. 9, both methods are in loose correlation, having a Pearson's r value of 0.26.

While there is some correlation between the two methods, subjectively speaking, the spherical harmonic representation overall appears to perform better than the EFD representation. This is, in part, an expected result, as the 2D projections of the EFD method may mask significant abnormalities in tooth structure that can be captured in the 3D representation of the spherical harmonics technique.

Example of a Computing System

Figure 10:
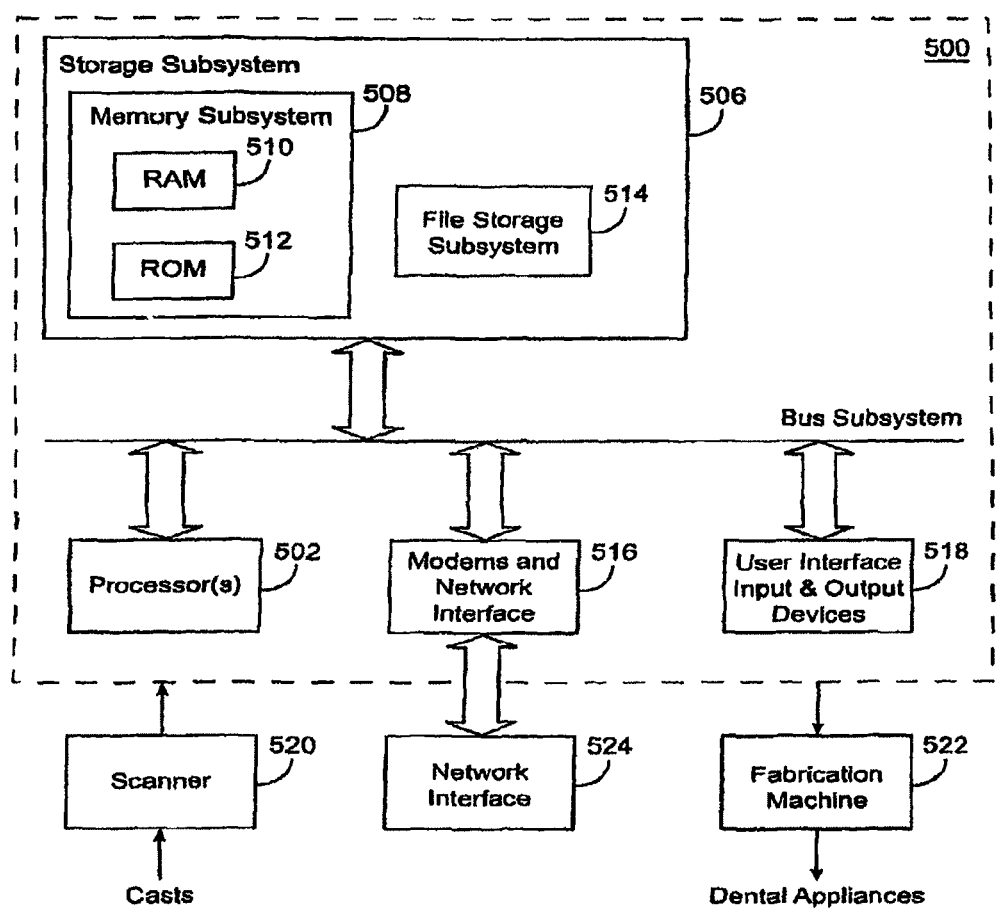
FIG. 10 is a simplified block diagram of an example of a data processing system for designing and manufacturing an orthodontic aligner.

The methods described herein may be performed by an apparatus, such as a data processing system, which may include hardware, software, and/or firmware for performing many of these steps described above. For example, FIG. 10 is a simplified block diagram of a data processing system 500. Data processing system 500 typically includes at least one processor 502 which communicates with a number of peripheral devices over bus subsystem 504. These peripheral devices typically include a storage subsystem 506 (memory subsystem 508 and file storage subsystem 514), a set of user interface input and output devices 518, and an interface to outside networks 516, including the public switched telephone network. This interface is shown schematically as "Modems and Network Interface" block 516, and is coupled to corresponding interface devices in other data processing systems over communication network interface 524. Data processing system 500 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 506 maintains the basic programming and data constructs that provide the functionality of the present invention. The software modules discussed above are typically stored in storage subsystem 506. Storage subsystem 506 typically comprises memory subsystem 508 and file storage subsystem 514.

Memory subsystem 508 typically includes a number of memories including a main random access memory (RAM) 510 for storage of instructions and data during program execution and a read only memory (ROM) 512 in which fixed instructions are stored. In the case of Macintosh-compatible personal computers the ROM would include portions of the operating system; in the case of IBM-compatible personal computers, this would include the BIOS (basic input/output system).

File storage subsystem 514 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 504 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 520 is responsible for scanning casts of the patient's teeth obtained either from the patient or from an orthodontist and providing the scanned digital data set information to data processing system 500 for further processing. In a distributed environment, scanner 520 may be located at a remote location and communicate scanned digital data set information to data processing system 500 over network interface 524.

Fabrication machine 522 fabricates dental appliances based on intermediate and final data set information received from data processing system 500. In a distributed environment, fabrication machine 522 may be located at a remote location and receive data set information from data processing system 500 over network interface 524.

In the context of the present disclosure, processing system 500 can evaluate the data from a plurality of samples of teeth according to the methods and techniques described above to determine the "most average" tooth shape for each tooth in the Universal Tooth Numbering system. The "most average" tooth shape information can then be transmitted to the fabrication machine 522 to fabricate the individual dental appliances with cavities representing the "most average" tooth shape in the proper position of un-erupted or erupting teeth for each specific patient.

The dental appliance fabricated by the fabrication machine 522 can include a cavity for accommodating the un-erupted or erupting tooth, and can be designed to implement at least a portion of a treatment plan, comprising a shell having a plurality of cavities therein designed to receive teeth of a jaw with at least one of the plurality of cavities being a cavity for accommodating an un-erupted or erupting tooth therein, wherein at least one of a size, shape, location, and orientation of at least one of the cavities for accommodating an un-erupted or erupting tooth is designed based upon a evaluation of a sample of teeth that calculates an optimal 3D shape for the un-erupted or erupting tooth. The evaluation can comprise the techniques described above, specifically the 2D Elliptic Fourier Descriptors method and the Spherical Harmonics method.

In another embodiment, the system 500 of FIG. 10 can include a non-transitory computing device readable medium having instructions stored thereon that are executable by a processor to cause a computing device to receive, via a computing device, data representing a plurality of teeth, identify data indicating which of the plurality of teeth are un-erupted or erupting, determine an optimal 3D shape for each of the un-erupted or erupting teeth after they have fully erupted using a modeling technique, and generate a series of incremental tooth arrangements incorporating the optimal 3D shape into a cavity positioned over each of the un-erupted or erupting teeth to define a proposed orthodontic treatment.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Example of Orthodontic Aligners

Figure 11:
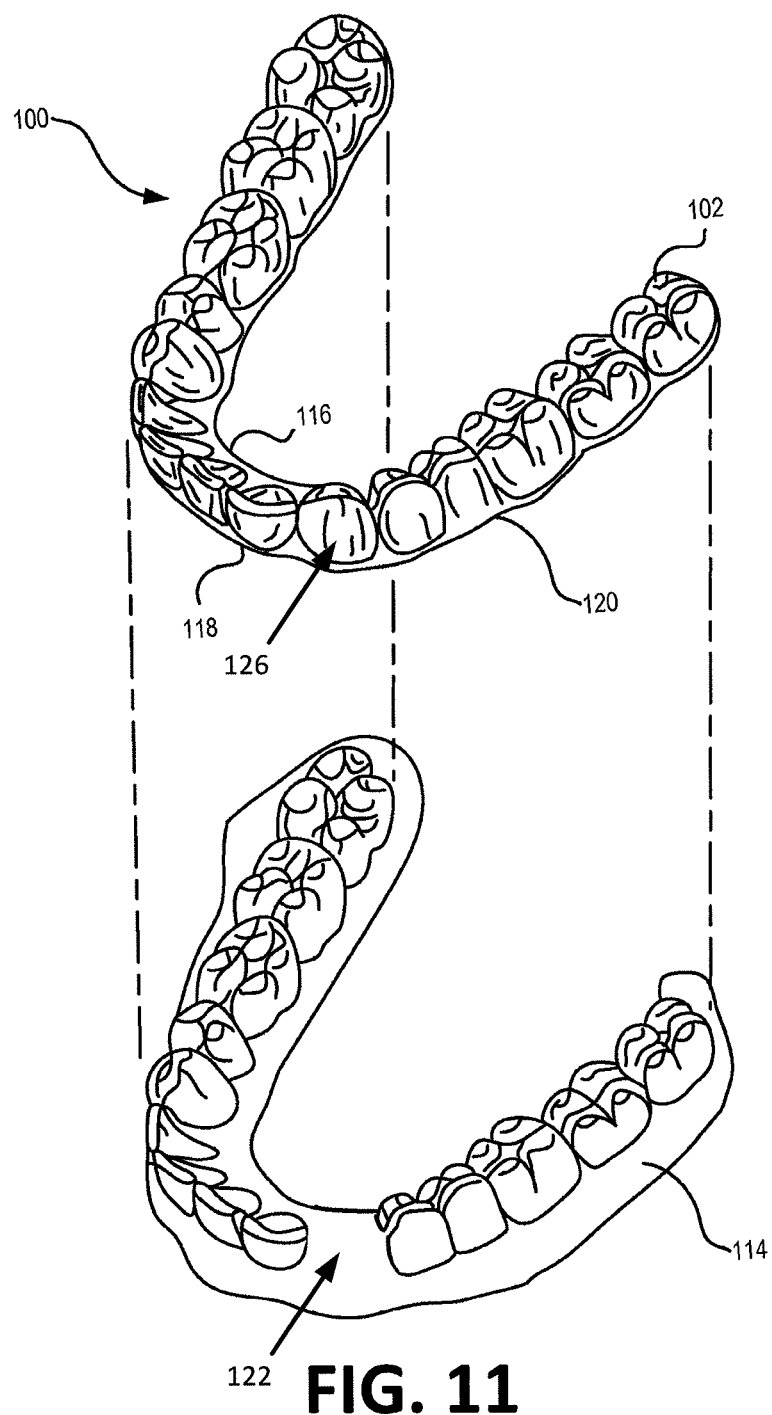
FIG. 11 is a diagram showing an example of an orthodontic aligner that includes a space buffer or cavity in the form of a "most average" tooth shape designed to fit over un-erupted teeth.

FIG. 11 shows an orthodontic aligner 100, which includes a cavity 126 in the form of a "most average" tooth shape as determined by either the EFD or spherical harmonics methods described above. The cavity 126 is designed to provide an adequate yet sufficient space for each specific un-erupted tooth while improving aesthetics and comfort for the patient during orthodontic aligner wear.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A computer-implemented method comprising:
gathering a first anatomical tooth identifier of an at least partially un-erupted tooth of a patient, the first anatomical tooth identifier forming a basis to identify the at least partially un-erupted tooth;
identifying a tooth type using the first anatomical tooth identifier;
gathering a representative 3D descriptor for the tooth type from a plurality of 3D descriptors for the tooth type, each of the plurality of 3D descriptors, including the representative 3D descriptor, parametrically repre- senting a plurality of virtual surface contours of the tooth type according to a plurality of spatial parameters, the representative 3D descriptor having a minimum distance to other 3D descriptors of the plurality of 3D descriptors in a 3D descriptor space formed of the plurality of 3D descriptors, and each of the plurality of 3D descriptors being associated with one of the plurality of 3D virtual representations of a plurality of teeth gathered from a plurality of subjects;

forming a virtual 3D tooth shape for the at least partially un-erupted tooth using the representative 3D descriptor; and providing instructions to form at least a portion of a removable orthodontic appliance for the at least partially un-erupted tooth using the 3D tooth shape for the at least partially un-erupted tooth.

2. The computer-implemented method of claim 1, wherein the plurality of 3D virtual representations of teeth each comprise a plurality of orthoscopic views of the plurality of teeth.

3. The computer-implemented method of claim 1, wherein the plurality of 3D descriptors comprise a convex bounding 3D shape.

4. The computer-implemented method of claim 1, wherein the plurality of 3D descriptors are represented using an Elliptic Fourier Descriptor (EFD) of the plurality of virtual surface contours.

5. The computer-implemented method of claim 4, wherein the plurality of spatial parameters comprise one or more locational components.

6. The computer-implemented method of claim 1, wherein the plurality of 3D descriptors comprises a plurality of spheres.

7. The computer-implemented method of claim 1, wherein the plurality of spheres comprise a plurality of voxelized spheres.

8. The computer-implemented method of claim 1, wherein the plurality of spatial parameters comprise a plurality of polar coordinates to virtually represent a plurality of voxelized spheres.

9. The computer-implemented of claim 1, wherein the removable orthodontic appliances comprises a polymeric appliance.

10. The computer-implemented of claim 1, wherein providing instructions to form at least the portion of the removable orthodontic appliance comprises providing instructions to three-dimensionally print the at least the portion of the removable orthodontic appliance.

11. The computer-implemented of claim 1, wherein the representative 3D descriptor comprises an average 3D descriptor of the plurality of 3D descriptors.

12. The computer-implemented method of claim 1, further comprising:
gathering a second anatomical tooth identifier of the tooth type, the second anatomical tooth identifier forming a basis to identify the tooth type;
gathering, using the second anatomical tooth identifier, the plurality of 3D virtual representations of a plurality of teeth from a plurality of subjects,
identifying the plurality of virtual surface contours for the tooth type;
identifying the plurality of 3D descriptors to parametrically represent the plurality of virtual surface contours according to the plurality of spatial parameters;
identifying a descriptor location in the 3D descriptor space of each of the plurality of 3D descriptors;
assigning a descriptor distance to each of the plurality of 3D descriptors, the descriptor distance representing a difference between the descriptor location of the each 3D descriptor and the descriptor location of a rest of the plurality of 3D descriptors; and
identifying the representative 3D descriptor for the tooth type by finding a minimum descriptor distance between two or more of the plurality of 3D descriptors.

13. The computer-implemented method of claim 12, wherein assigning the descriptor distance comprises:
identifying a variance between each of the plurality of 3D descriptors and the rest of the plurality of 3D descriptors; and
minimizing the variance.

14. The computer-implemented method of claim 12, further comprising normalizing rotational orientations or sizes of the plurality of 3D descriptors before identifying the representative 3D descriptor for the tooth type.

15. The computer-implemented method of claim 1, wherein identifying the plurality of 3D descriptors comprises creating at least one spherical harmonic based signature based on a sum of spherical harmonics for the plurality of 3D descriptors.

16. The computer-implemented method of claim 15, wherein:
the at least one spherical harmonic based signature comprises a plurality of spherical harmonic based signatures; and
finding the minimum descriptor distance comprises identifying a minimum distance between two or more of the plurality of spherical harmonic based signatures in the 3D descriptor space.

17. The computer-implemented method of claim 16, wherein identifying the minimum distance comprises performing a least squares analysis of a Euclidean distance between the two or more of the plurality of spherical harmonic based signatures.

18. A computer-implemented method comprising:
gathering an anatomical tooth identifier of a tooth type, the anatomical tooth identifier forming a basis to identify the tooth type;
gathering, using the anatomical tooth identifier, a plurality of three-dimensional (3D) virtual representations of a plurality of teeth from a plurality of subjects, each of the plurality of teeth having the tooth type;
identifying a plurality of virtual surface contours corresponding to surfaces of each of the plurality of 3D virtual representations;
identifying a plurality of 3D descriptors to parametrically represent the plurality of virtual surface contours according to a plurality of spatial parameters, the plurality of 3D descriptors having descriptor locations in a 3D descriptor space;
assigning a descriptor distance to each of the plurality of 3D descriptors, the descriptor distance representing a difference between the descriptor location of the each 3D descriptor and the descriptor location of a rest of the plurality of 3D descriptors; and
identifying a representative 3D descriptor for the tooth type using the descriptor distances, the representative 3D descriptor having a minimum distance to the rest of the plurality of 3D descriptors.

19. A system comprising:
one or more processors;
memory coupled to the one or more processors, the memory configured to store computer-program instructions, that, when executed by the one or more processors, perform a computer-implemented method comprising:
gathering a first anatomical tooth identifier of an at least partially un-erupted tooth of a patient, the first anatomical tooth identifier forming a basis to identify the at least partially un-erupted tooth;
identifying a tooth type using the first anatomical tooth identifier;
gathering a representative 3D descriptor for the tooth type from a plurality of 3D descriptors for the tooth type,
each of the plurality of 3D descriptors, including the representative 3D descriptor, parametrically representing a plurality of virtual surface contours of the tooth type according to a plurality of spatial parameters,
the representative 3D descriptor having a minimum distance to other 3D descriptors of the plurality of 3D descriptors in a 3D descriptor space formed of the plurality of 3D descriptors, and
each of the plurality of 3D descriptors being associated with one of the plurality of 3D virtual representations of a plurality of teeth gathered from a plurality of subjects;
forming a virtual 3D tooth shape for the at least partially un-erupted tooth using the representative 3D descriptor; and
providing instructions to form at least a portion of a removable orthodontic appliance for the at least partially un-erupted tooth using the 3D tooth shape for the at least partially un-erupted tooth.

20. The system of claim 19, wherein the computer-implemented method further comprises:
gathering a second anatomical tooth identifier of the tooth type, the second anatomical tooth identifier forming a basis to identify the tooth type;
gathering, using the second anatomical tooth identifier, the plurality of 3D virtual representations of a plurality of teeth from a plurality of subjects,
identifying the plurality of virtual surface contours for the tooth type;
identifying the plurality of 3D descriptors to parametrically represent the plurality of virtual surface contours according to the plurality of spatial parameters;
identifying a descriptor location in the 3D descriptor space of each of the plurality of 3D descriptors;
assigning a descriptor distance to each of the plurality of 3D descriptors, the descriptor distance representing a difference between the descriptor location of the each 3D descriptor and the descriptor location of a rest of the plurality of 3D descriptors; and
identifying the representative 3D descriptor for the tooth type by finding a minimum descriptor distance between two or more of the plurality of 3D descriptors.

21. A system comprising:
one or more processors;
memory coupled to the one or more processors, the memory configured to store computer-program instructions, that, when executed by the one or more processors, perform a computer-implemented method comprising:
gathering an anatomical tooth identifier of a tooth type, the anatomical tooth identifier forming a basis to identify the tooth type;
gathering, using the anatomical tooth identifier, a plurality of three-dimensional (3D) virtual representations of a plurality of teeth from a plurality of subjects, each of the plurality of teeth having the tooth type;
identifying a plurality of virtual surface contours corresponding to surfaces of each of the plurality of 3D virtual representations;
identifying a plurality of 3D descriptors to parametrically represent the plurality of virtual surface contours according to a plurality of spatial parameters, the plurality of 3D descriptors having descriptor locations in a 3D descriptor space;
assigning a descriptor distance to each of the plurality of 3D descriptors, the descriptor distance representing a difference between the descriptor location of the each 3D descriptor and the descriptor location of a rest of the plurality of 3D descriptors; and
identifying a representative 3D descriptor for the tooth type using the descriptor distance, the representative 3D descriptor having a minimum distance to the rest of the plurality of 3D descriptors.

* * * * *